United States Patent
Gulin et al.

(10) Patent No.: US 11,341,419 B2
(45) Date of Patent: *May 24, 2022

(54) METHOD OF AND SYSTEM FOR GENERATING A PREDICTION MODEL AND DETERMINING AN ACCURACY OF A PREDICTION MODEL

(71) Applicant: YANDEX EUROPE AG, Lucerne (CH)

(72) Inventors: Andrey Vladimirovich Gulin, Moscow region (RU); Andrey Sergeevich Mishchenko, Moscow region (RU); Konstantin Vyacheslavovich Vorontsov, Moscow (RU); Yevgeny Andreevich Sokolov, Belaya Kalitva (RU)

(73) Assignee: YANDEX EUROPE AG, Lucerne (CH)

( * ) Notice: Subject to any disclaimer, the term of this patent is extended or adjusted under 35 U.S.C. 154(b) by 389 days.

This patent is subject to a terminal disclaimer.

(21) Appl. No.: 16/536,348

(22) Filed: Aug. 9, 2019

(65) Prior Publication Data
US 2019/0362267 A1    Nov. 28, 2019

Related U.S. Application Data

(63) Continuation of application No. 15/263,654, filed on Sep. 13, 2016, now Pat. No. 10,387,801.

(30) Foreign Application Priority Data

Sep. 29, 2015  (RU) .......................... RU2015141340

(51) Int. Cl.
*G06N 5/02*      (2006.01)
*G06N 20/00*   (2019.01)

(52) U.S. Cl.
CPC ............... *G06N 5/02* (2013.01); *G06N 5/022* (2013.01); *G06N 20/00* (2019.01)

(58) Field of Classification Search
CPC .............................. G06N 20/00; G06N 5/022
See application file for complete search history.

(56) References Cited

U.S. PATENT DOCUMENTS 5,652,829 A    7/1997    Hong
5,657,424 A    8/1997    Farrell et al.
(Continued)

FOREIGN PATENT DOCUMENTS

CN    100562856 C    11/2009
JP    2008511082 A    4/2008
(Continued)

OTHER PUBLICATIONS

Aitkenhead, "A co-evolving decision tree classification method", ScienceDirect, 2008 (Year: 2008).*
(Continued)

*Primary Examiner* — Ann J Lo
*Assistant Examiner* — Van C Mang
(74) *Attorney, Agent, or Firm* — BCF LLP

(57) ABSTRACT

A computer-implemented method of and a system for generating a prediction model and determining an accuracy parameter of a trained decision tree prediction model. The method comprises accessing the trained decision tree prediction model having been generated at least partially based on a set of training objects; generating a subset of random parameters of interest; associating the subset of random parameters of interests with a given leaf; determining a leaf accuracy parameter based on (i) the parameters of interest associated with the given leaf and (ii) the subset of random parameters of interest of the given leaf; and determining the accuracy parameter of the trained decision tree prediction
(Continued)

model based on the determined leaf accuracy parameter for each of the leafs of the decision tree.

21 Claims, 11 Drawing Sheets

(56) References Cited

U.S. PATENT DOCUMENTS

| | | | |
|---|---|---|---|
| 5,978,497 | A | 11/1999 | Lee et al. |
| 6,115,802 | A | 9/2000 | Tock et al. |
| 6,279,004 | B1 | 8/2001 | Lee et al. |
| 6,360,220 | B1 | 3/2002 | Forin |
| 6,523,015 | B1 | 2/2003 | Bera et al. |
| 6,988,180 | B2 | 1/2006 | Kadatch |
| 7,113,932 | B2 | 9/2006 | Tayebnejad et al. |
| 7,287,012 | B2 | 10/2007 | Corston et al. |
| 7,349,917 | B2 | 3/2008 | Forman et al. |
| 7,349,926 | B2 | 3/2008 | McKenney et al. |
| 7,451,166 | B2 | 11/2008 | Damani et al. |
| 7,574,409 | B2 | 8/2009 | Patinkin |
| 7,668,851 | B2 | 2/2010 | Triplett |
| 7,673,233 | B2 | 3/2010 | Moore et al. |
| 7,702,628 | B1 | 4/2010 | Luchango et al. |
| 7,743,003 | B1 | 6/2010 | Tong et al. |
| 7,916,728 | B1 | 3/2011 | Mimms |
| 8,010,466 | B2 | 8/2011 | Patinkin |
| 8,032,550 | B2 | 10/2011 | Schneider |
| 8,032,551 | B2 | 10/2011 | Schneider |
| 8,136,025 | B1 | 3/2012 | Zhu et al. |
| 8,150,723 | B2 | 4/2012 | Chen et al. |
| 8,190,537 | B1 | 5/2012 | Singh et al. |
| 8,214,157 | B2 | 7/2012 | Moser et al. |
| 8,250,009 | B1 | 8/2012 | Breckenridge et al. |
| 8,301,847 | B2 | 10/2012 | Dantzig et al. |
| 8,311,967 | B1 | 11/2012 | Lin et al. |
| 8,341,158 | B2 | 12/2012 | Acharya |
| 8,370,337 | B2 | 2/2013 | Kanungo et al. |
| 8,396,287 | B2 | 3/2013 | Adam et al. |
| 8,412,648 | B2 | 4/2013 | Karypis et al. |
| 8,438,122 | B1 | 5/2013 | Mann et al. |
| 8,473,431 | B1 | 6/2013 | Mann et al. |
| 8,489,632 | B1 | 7/2013 | Breckenridge et al. |
| 8,533,224 | B2 | 9/2013 | Lin et al. |
| 8,543,517 | B2 | 9/2013 | Shotton et al. |
| 8,543,586 | B2 | 9/2013 | Glachant et al. |
| 8,572,071 | B2 | 10/2013 | Pottenger et al. |
| 8,583,567 | B1 | 11/2013 | Kumar et al. |
| 8,584,233 | B1 | 11/2013 | Yang et al. |
| 8,595,154 | B2 | 11/2013 | Breckenridge et al. |
| 8,611,592 | B2 | 12/2013 | Wallace et al. |
| 8,655,029 | B2 | 2/2014 | Shiell et al. |
| 8,661,029 | B1 | 2/2014 | Kim et al. |
| 8,694,444 | B2 | 4/2014 | Faddoul et al. |
| 8,762,299 | B1 | 6/2014 | Breckenridge et al. |
| 8,843,519 | B1 | 9/2014 | Lin et al. |
| 8,868,472 | B1 | 10/2014 | Lin et al. |
| 8,880,446 | B2 | 11/2014 | Wellman et al. |
| 8,909,564 | B1 | 12/2014 | Kaplow et al. |
| 8,965,829 | B2 | 2/2015 | Pattillo |
| 9,002,682 | B2 | 4/2015 | Kasabov |
| 9,038,172 | B2 | 5/2015 | Miller et al. |
| 9,348,920 | B1 | 5/2016 | Kesin |
| 9,639,807 | B2 | 5/2017 | Berengueres et al. |
| 2002/0143787 | A1 | 10/2002 | Knee et al. |
| 2002/0188424 | A1 | 12/2002 | Grinstein et al. |
| 2002/0188618 | A1 | 12/2002 | Ma et al. |
| 2003/0014405 | A1 | 1/2003 | Shapiro et al. |
| 2003/0061213 | A1 | 3/2003 | Yu et al. |
| 2003/0074341 | A1 | 4/2003 | Blackburn et al. |
| 2003/0163462 | A1 | 8/2003 | Kawamura |
| 2003/0176931 | A1* | 9/2003 | Pednault ............... G06N 20/00 700/31 |
| 2003/0204483 | A1 | 10/2003 | Arning et al. |
| 2004/0111169 | A1 | 6/2004 | Hong et al. |
| 2004/0215430 | A1* | 10/2004 | Huddleston ........... G06Q 10/10 703/2 |
| 2004/0215606 | A1 | 10/2004 | Cossock |
| 2005/0189415 | A1 | 9/2005 | Fano et al. |
| 2006/0026138 | A1 | 2/2006 | Robertson et al. |
| 2006/0112121 | A1 | 5/2006 | McKenney et al. |
| 2006/0136390 | A1 | 6/2006 | Zhao et al. |
| 2007/0005646 | A1 | 1/2007 | Dumais et al. |
| 2007/0217676 | A1 | 9/2007 | Grauman et al. |
| 2007/0244747 | A1 | 10/2007 | Nikovski |
| 2008/0071542 | A1 | 3/2008 | Yu |
| 2008/0077544 | A1 | 3/2008 | Sureka |
| 2008/0154938 | A1 | 6/2008 | Cheslow |
| 2008/0307069 | A1 | 12/2008 | Froment et al. |
| 2009/0030864 | A1 | 1/2009 | Pednault et al. |
| 2009/0031924 | A1 | 2/2009 | White et al. |
| 2009/0164437 | A1 | 6/2009 | Torbjornsen |
| 2009/0182723 | A1 | 7/2009 | Shnitko et al. |
| 2009/0319481 | A1 | 12/2009 | Chitrapura et al. |
| 2010/0030780 | A1 | 2/2010 | Eshghi et al. |
| 2010/0042603 | A1 | 2/2010 | Smyros et al. |
| 2010/0082421 | A1* | 4/2010 | Tuladhar ............... G06Q 20/102 705/14.41 |
| 2010/0312727 | A1 | 12/2010 | Pottenger et al. |
| 2011/0055000 | A1 | 3/2011 | Zhang et al. |
| 2011/0153611 | A1 | 6/2011 | Ankisettipalli et al. |
| 2011/0188715 | A1 | 8/2011 | Shotton et al. |
| 2011/0225372 | A1 | 9/2011 | Pirog |
| 2011/0225589 | A1 | 9/2011 | Pirog et al. |
| 2012/0203745 | A1 | 8/2012 | Myers et al. |
| 2012/0278263 | A1 | 11/2012 | Borthwick et al. |
| 2013/0117684 | A1 | 5/2013 | Ingole et al. |
| 2013/0173571 | A1 | 7/2013 | Chen et al. |
| 2013/0345585 | A1 | 12/2013 | Gopal et al. |
| 2014/0012238 | A1 | 1/2014 | Chen et al. |
| 2014/0027975 | A1 | 1/2014 | Mizuno |
| 2014/0122381 | A1* | 5/2014 | Nowozin ............... G06N 20/20 706/12 |
| 2014/0129493 | A1 | 5/2014 | Leopold |
| 2014/0195972 | A1 | 7/2014 | Lee et al. |
| 2014/0203999 | A1 | 7/2014 | Shim |
| 2014/0214736 | A1 | 7/2014 | Kimmel et al. |
| 2014/0317115 | A1 | 10/2014 | Pauly |
| 2014/0337255 | A1 | 11/2014 | Eads |
| 2014/0337269 | A1 | 11/2014 | Eads |
| 2015/0012465 | A1 | 1/2015 | Pingenot |
| 2015/0199699 | A1 | 7/2015 | Milton et al. |
| 2015/0356458 | A1 | 12/2015 | Berengueres et al. |
| 2015/0379423 | A1 | 12/2015 | Dirac et al. |
| 2015/0379426 | A1 | 12/2015 | Steele et al. |
| 2016/0155070 | A1 | 6/2016 | Hoover et al. |
| 2017/0091670 | A1 | 3/2017 | Gulin et al. |
| 2018/0232375 | A1 | 8/2018 | Venkataraman et al. |

FOREIGN PATENT DOCUMENTS

| | | |
|---|---|---|
| JP | 2011129135 A | 6/2011 |
| RU | 2391791 C2 | 6/2010 |
| RU | 2435212 C2 | 11/2011 |
| RU | 2491622 C1 | 8/2013 |
| RU | 2015141339 A | 4/2017 |
| RU | 2015141340 A | 4/2017 |
| RU | 2632133 C2 | 10/2017 |
| WO | 2006072011 A2 | 7/2006 |
| WO | 2006102381 A2 | 9/2006 |
| WO | 2013001535 A2 | 1/2013 |

OTHER PUBLICATIONS

Office Action with regard to the counterpart U.S. Appl. No. 16/000,809 dated Jun. 8, 2021.

Ahmad, et al. "Random Ordinality Ensembles: Ensemble methods for multi-valied categorical data", Information Science 296 (2015) 75-94 (Year: 2015)—cited in the Office Action with regard to the counterpart U.S. Appl. No. 16/000,819 dated May 27, 2021.

Office Action with regard to the counterpart U.S. Appl. No. 16/000,819 dated May 27, 2021.

(56) References Cited

OTHER PUBLICATIONS

Dorogush et al., "CatBoost: gradient boosting with categorical features support", YANDEX, Moscow, pp. 1-7.
Wolpert, "Stacked Generalization", Complex Systems Group, Theoretical Division, and Center for Non-linear Studies, Los Alamos, 57 pages.
Breiman, "Stacked Regressions", Machine Learning, 24, 49-64,1996, pp. 50-64.
Bai et al., "Learning to Rank with (a Lot of) Word Features", NEC Labs America, Princeton, USA, pp. 1-24.
Chen et al., "XGBoost: A Scalable Tree Boosting System", KDD, August, USA, 2016, 13 pages.
Cortes et al., "Deep Boosting", Proceedings of the 31st International Conference on Machine Learning, China, 2014, vol. 32, 9 pages.
Suen et al., "Combining Bias and Variance Reduction Techniques for Regression Trees", Proceedings of the 16th European Conference on Machine Learning (ECML), Portugal, 2005, 8 pages.
Suen et al., "Combining Bias and Variance Reduction Techniques for Regression", Technical Report UT-AI-TR-05-321, Austin, 12 pages.
Ling et al., "Model Ensemble for Click Prediction in Bing Search Ads", International World Wide Web Conference Committee (IW3C2), Australia, 2017, pp. 689-698.
Wu et al., "A Two-Stage Ensemble of Diverse Models for Advertisement Ranking in KDD Cup 2012", 14 pages.
Hillard et al., "The Sum of Its Parts: Reducing Sparsity in Click Estimation with Query Segments", Yahoo! Inc, USA, 30 pages.
Chapelle et al., "Simple and Scalable Response Prediction for Display Advertising", ACM Transactions on Intelligent Systems and Technology, vol. 5, No. 4, Article 61, 2014, pp. 1-34.
Chapelle, "Modeling Delayed Feedback in Display Advertising", KDD'14, USA, 2014, 9 pages.
Graepel, "Web-Scale Bayesian Click-Through Rate Prediction for Sponsored Search Advertising in Microsoft's Bing Search Engine", Proceedings of the 27th International Conference on Machine Learning, Israel, 2010, 8 pages.
Jimenez et al., "Neural Methods for Dynamic Branch Prediction", ACM Transactions on Computer Systems, 2002, vol. 20, No. 4, pp. 369-397.
Croux et al., "Trimmed Bagging", Faculty of Economics and Management University Center of Statistics, Belgium, pp. 1-9.
Breiman, "Using Adaptive Bagging to Debias Regressions", Technical Report 547, USA, 1999, pp. 1-16.
Sorokina et al., "Additive Groves of Regression Trees", Department of Computer Science, Cornell University, Ithaca, NY, USA, pp. 1-12.
Ganjisaffar et al., "Bagging Gradient-Boosted Trees for High Precision, Low Variance Ranking Models", China, 2011, 10 pages.
Koltchinskii et al., "Empirical Margin Distributions and Bounding the Generalization Error of Combined Classifiers", The Annals of Statistics, 2002, vol. 30, No. 1, pp. 1-50.
Koltchinskii et al., "Some New Bounds on the Generalization Error of Combined Classifiers", Department of Mathematics and Statistics, USA, 7 pages.
Blum et al., "The Ladder: A Reliable Leaderboard for Machine Learning Competitions", 2015, pp. 1-16.
"Boosting", Machine Learning for Trading, 2016, https://www.youtube.com/watch?v=GM3CDQfQ4sw.
"AGBoost A Scalable Tree Boosting System", LA Machine Learning Meetup Group, 2016, https://www.youtube.com/watch?v=Vly8xGnNiWs.
"Machine learning—Decision trees", UBC by Nando de Freitas, 2013, https://www.youtube.com/watch?v=-dCtJjlEEgM&feature=youtu.be&t=35m.
"XGBoost A Scalable Tree Boosting System", LA Machine Learning Meetup Group, 2016, https://www.youtube.com/watch?v=Vly8xGnNiWs&feature=youtu.be&t=27m.
"XGBoost A Scalable Tree Boosting System", LA Machine Learning Meetup Group, 2016, https://www.youtube.com/watch?v=Vly8xGnNiWs&feature=youtu.be&t=30m.

Kerdprasop, "Discrete Decision Tree Induction to Avoid Overfilling on Categorical Data", Recent Researches in Computational Techniques, Non Linear Systems and Control, ISBN: 978-1-61804-011-4, pp. 247-252.
Seldin et al., "Multi-Classification by Categorical Features via Clustering", Proceedings of the 25th International Conference on Machine Learning, Finland, 2008, 8 pages.
Zhang, "Deep Learning over Multi-field Categorical Data", University College London, United Kingdom, 2016, 12 pages.
Friedman, "1999 Reitz Lecture - Greedy Function Approximation: A Gradient Boosting Machine", The Annals of Statistics, 2001, vol. 29, No. 5, pp. 1189-1232.
Micci-Barreca, "A Preprocessing Scheme for High-Cardinality Categorical Attributes in Classification and Prediction Problems", SIGKDD Explorations, USA, vol. 3, Issue 1, pp. 27-32.
Chen et al., "Large-Scale Behavioral Targeting", KDD'09, France, 2009, pp. 209-217.
McMahan et al., "Ad Click Prediction: a View from the Trenches", KDD'13, USA, 2013, 9 pages.
Yeh et al., "Two-level adaptive training branch prediction", originally published in Proc. 24ty Ann. Int'l Symp. Microarchitecture, 1991, 14 pages.
Hothorn et al., "Double-bagging: combining classifers by bootstrap aggregation", Pattern Recognition, 2003, vol. 36, pp. 1303-1309.
Breiman, "Using Iterated Bagging to Debias Regressions", Machine Learning, vol. 45, 2001, pp. 261-277.
Abstract for US2006047925 (A1) (corresponding document for JP2008511082) retrieved on Espacenet on Apr. 30, 2018.
English Abstract for JP2011129135 retrieved on Espacenet on Apr. 30, 2018.
English Abstract for CN100562856 retrieved on Espacenet on Apr. 30, 2018.
International Search Report and Written Opinion with regard to PCT/IB2015/059001 dated Feb. 18, 2016.
International Preliminary Report on Patentability with regard to PCT/IB2015/059001 dated Aug. 25, 2016.
International Search Report and Written Opinion with regard to PCT/IB2015/058957 dated Feb. 10, 2016.
International Preliminary Report on Patentability with regard to PCT/IB2015/058957 dated Nov. 4, 2016.
Miyashita et al.. Convolutional Neural Networks using Logarithmic Data Representation, 2016, vol. 2 (Year: 2016).
Office Action dated Apr. 25, 2019 in respect of the U.S. Appl. No. 15/263,654.
Notice of Allowance with regard to the U.S. Appl. No. 15/263,654 dated Jun. 28, 2019.
U.S. Appl. No. 15/263,654, filed Sep. 13, 2016.
Russian search report dated Oct. 13, 2016 from Russian Patent Application No. 2015141339.
Foulds, Learning Instance Weights in Multi-Instance Learning, Thesis for the degree of Master of Science at the University of Waikato, Department of Computer Science, Feb. 2007-Feb. 2008, 182 pages.
JMP, A Business Unit of SAS, Version 9, Modeling and Multivariate Methods, SAS Institute Inc. 2010. JMP® 9 Modeling and Multivariate Methods. Cary, NC: Sas Institute Inc. JMP® 9 Modeling and Multivariate Methods Copyright © 2010, SAS Institute Inc., Cary, NC, USA, 696 pages.
Search Report with regard to the counterpart RU Patent Application No. 2017140973 completed Mar. 21, 2019.
Search Report with regard to the counterpart RU Patent Application No. 2017140974 completed Apr. 11, 2019.
Search Report with regard to the counterpart RU Patent Application No. 2017140969 completed Jan. 30, 2019.
English Translation of Claims for RU2015141339 retrieved on Internet on Jun. 7, 2019.
English Abstract for RU2015141340 retrieved on Espacenet on Jun. 7, 2019.
Dwork, "Calibrating Noise to Sensitivity in Private Data Analysis", Microsoft Research, Silicon Valley, pp. 1-20.
"Categorical variables: Solving the overfitting problem in decision trees", Mixotricha, 2010, 5 pages (Screenshot).

(56) References Cited

OTHER PUBLICATIONS

"Display Advertising Challenge", Kaggle, 2017, 2 pages (Screenshot), https://www.kaggle.com/c/criteo-display-ad-challenge.
"Feature hashing", Wikipedia, 2017, 4 pages, https://en.wikipedia.org/wiki/Feature_hashing.
Koltchinskii et al., "Further Explanation of the Effectiveness of Voting Methods: The Game between Margins and Weights", D Helmbold and B. Williamson (Eds.), 2001, 2 pages.
Zhao et al., "GB-CENT: Gradient Boosted Categorical Embedding and Numerical Trees", International World Wide Web Conference Committee, 2017, Australia, 9 pages.
"Gradient Boosting", Wikipedia, 2017, 6 pages (Screenshot), https://en.wikipedia.org/wiki/Gradient_boosting.
"Greedy Algorithm", Wikipedia, 2017, 4 pages (Screenshot), https://en.wikipedia.org/wiki/Greedy_algorithm.
"Grupo Bimbo Inventory Demand", Kaggle, 2017, 2 pages (Screenshot), https://www.kaggle.com/c/grupo-bimbo-inventory-demand.
"Including High-Cardinality Attributes in Predictive Models a Case Study in Churn Prediction in the Energy Sector", 2017, Abstract, 4 pages (Screenshot), https://www.researchgate.net/publication/272522918_Including_High-Cardinality_Attributes_in_Predictive_Models_a_Case_Study_in_Churn_Prediction_in_the_Energy_Sector.
"Liberty Mutual Group: Property Inspection Prediction", Kaggle, 2017, 2 pages (Screenshot), https://www.kaggle.com/c/liberty-mutual-group-property-inspection-prediction.
Zumel, "Modeling Trick: Impact Coding of Categorical Variables with Many Levels", Win-Vector Blog, 2012, 10 pages http://www.win-vector.com/blog/2012/07/modeling-trick-impact-coding-of-categorical-variables-with-many-levels/.
Panchenko, "New Zero-Error Bounds for Voting Algorithms", 2001, USA, pp. 1-16.
Breiman, "Out-of-Bag Estimation", USA, pp. 1-13.
Valle et al., "Two bagging algorithms with coupled learners to encourage diversity", CHILE, 10 pages.
"Bootstrapping vs Bayesian Bootstrapping conceptually?", StackExchange, 2017, 2 pages (Screenshot), https://stats.stackexchange.com/questions/181350/bootstrapping-vs-bayesian-bootstrapping-conceptually.
"Springleaf Marketing Response", Kaggle, 2017, 2 pages (Screenshot), https://www.kaggle.com/c/springleaf-marketing-response.
"ReeSys Challenge 2015", 2017, 1 page (Screenshot), https://recsys.acm.org/recsys15/challenge/.
"A fast, distributed, high performance gradient boosting (GDBT, GBRT, GBM or MART) framework based on decision tree algorithms, used for ranking, classification and many other machine learning tasks. It is under the umbrella of the DMTK", GitHub, 2017, 3 pages (Screenshot), https://github.com/Microsoft/LightGBM.
"Scalable, Portable and Distributed Gradient Boosting (GBDT, GBRT or GBM) Library, for Python, R, Java, Scala, C++ and more. Runs on single machine, Hadoop, Spark, Flink and DataFlow", GitHub, 2017, 2 pages (Screenshot), https://github.com/dmlc/xgboost.
Zhang, "What is outoffold average?", 2017, 2 pages (Screenshot), https://stats.stackexchange.com/questions/224237/what-is-out-of-fold-average/224240.
"Boosting (machine learning)", Wikipedia, 2017, 5 pages (Screenshot), https://en.wikipedia.org/wiki/Boosting_(machine_learning).
"Bosch Production Line Performance", Kaggle, 2017, 2 pages (Screenshot), https://www.kaggle.com/c/bosch-production-line-performance.
"BNP Paribas Cardif Claims Management", Kaggle, 2017, 2 pages (Screenshot), https://www.kaggle.com/c/bnp-paribas-cardif-claims-management.
Pavlov et al., "BagBoo: A Scalable Hybrid Bagging-the-Boosting Model", CIKM'10, 2010, Canada, pp. 1897-1900.
Romov et al., "RecSys Challenge 2015: ensemble learning with categorical features", Yandex Data Factory, Moscow, 4 pages.
"Allstate Claims Severity", Kaggle, 2017 2 pages (Screenshot), https://www.kaggle.com/c/allstate-claims-severity.
Schapire et al., "Boosting the Margin: a New Explanation for The Effectiveness of Voting Methods", The Annals of Statistics, 1998, vol. 26, No. 5, pp. 1651-1686.
Freund et al., "A Decision-theoretic Generalization of Online Learning and an Application to Boosting", Journal of Computer and System Sciences, 1997, vol. 5, No. 1, 35 pages.
Valentini et al., "Low Bias Bagged Support Vector Machines", Proceedings of the Twentieth International Conference on Machine Learning, USA, 2003, 8 pages.
Zhang et al., "Boosting with Early Stopping: Convergence and Consistency", The Annals of Statistics, 2005, vol. 33, No. 4, pp. 1538-1579.
Xu, Monte Cado cross validation, Chemometrics and Intelligent Laboratory Systems 56 (2001), pp. 1-11.
Rupp, Kernel Methods for Virtual Screening, Dissertation, Frankfurt, Jan. 30, 2009, 202 pages.
Avidan, "Joint feature-basis subset selection", Mitsubishi Electric Research Labs, USA, 8 pages.
Kotsiantis, "Supervised Machine Learning: A Review of Classification Techniques", Informatica, vol. 31, 2007, pp. 249-268.
Mukhopadhyay et al., "A Syntactic Classification based Web Page Ranking Algorithm", 6th International Workshop an MSPT Proceedings, MSPT 2006, pp. 83-92.
Trofimov, "Using boosted trees for click-through rate prediction for sponsored search", Yandex, Moscow, 6 pages.
Webb, "MultiBoosting: A Technique for Combining Boosting and Wagging", Machine Learning, 2000, vol. 40, pp. 159-197.
Jiang, "Novel Boosting Frameworks to Improve the Performance of Collaborative Filtering", JMLR: Workshop and Conference Proceedings, vol. 29, 2013, pp. 87-99.
Prokhorenkova et al., "CatBoost: unbiased boosting with categorical features", YANDEX, Moscow, Apr. 2018, pp. 1-11.
Gulin, "Online Learning or Don't Look Ahead", YANDEX, Oct. 2015, https://www.youtube.com/watch?v=rAwFI3UPqCQ&t.
U.S. Appl. No. 16/000,809, filed Jun. 5, 2018.
U.S. Appl. No. 16/000,819, filed Jun. 5, 2018.
U.S. Appl. No. 16/000,977, filed Jun. 6, 2018.
Office Action with regard to the counterpart U.S. Appl. No. 16/000,977 dated Sep. 24, 2021.
Nettleton et al., "Analysis of Web Search Engine Clicked Documents", 2006, 2006 Fourth Latin American Web Congress, pp. 209-219. (Year: 2006).

* cited by examiner

METHOD OF AND SYSTEM FOR GENERATING A PREDICTION MODEL AND DETERMINING AN ACCURACY OF A PREDICTION MODEL

CROSS-REFERENCE

The present application is a continuation of U.S. patent application Ser. No. 15/263,654 filed on Sep. 13, 2016, entitled "METHOD OF AND SYSTEM FOR GENERATING A PREDICTION MODEL AND DETERMINING AN ACCURACY OF A PREDICTION MODEL," which claims priority to Russian Patent Application No. 2015141340, filed Sep. 29, 2015, entitled "METHOD OF AND SYSTEM FOR GENERATING A PREDICTION MODEL AND DETERMINING AN ACCURACY OF A PREDICTION MODEL", and relates to (i) Russian Patent Application No. 2015120563, filed Jun. 1, 2015, entitled "Method of and System for Generating a Hashed Complex Vector" (the '563 application hereinafter), to (ii) Russian Patent Application No. 2015125383, filed Jun. 29, 2015, entitled "Method of and System for Updating a Data Table", to (iii) a Russian Patent Application No. 2015141339, filed June 29, entitled "Method of and System for Generating a Prediction Model", the content of which is incorporated by reference herein in their entirety in those jurisdictions allowing for incorporations by reference.

FIELD

The present technology relates to systems and methods for generating a prediction model and/or determining an accuracy of a prediction model. In particular, the systems and methods aim at improving an accuracy of a prediction model that may take the form of a decision tree model, the decision tree model being used as part of a machine-learning system.

BACKGROUND

Search Engine Context

Typically, in building a search-efficient data collection management system such as web search engines, data items are indexed according to some or all of the possible search terms that may be contained in search queries. Thus, conventionally an "inverted index" of the data collection is created, maintained, and updated by the system. The inverted index will comprise a large number of "posting lists" to be reviewed during execution of a search query. Each posting list corresponds to a potential search term and contains "postings", which are references to the data items in the data collection that include that search term (or otherwise satisfy some other condition that is expressed by the search term). For example, if the data items are text documents, as is often the case for Internet (or "Web") search engines, then search terms are individual words (and/or some of their most often used combinations), and the inverted index comprises one posting list for every word that has been encountered in at least one of the documents.

Search queries, especially those made by human users, typically have the form of a simple list of one or more words, which are the "search terms" of the search query. Every such search query may be understood as a request to the search engine to locate every data item in the data collection containing each and every one of the search terms specified in the search query. Processing of a search query will involve searching through one or more posting lists of the inverted index. As was discussed above, typically there will be a posting list corresponding to each of the search terms in the search query. Posting lists are searched as they can be easily stored and manipulated in a fast access memory device, whereas the data items themselves cannot (the data items are typically stored in a slower access storage device). This generally allows search queries to be performed at a much higher speed.

Typically, each data item in a data collection is numbered. Rather than being ordered in some chronological, geographical or alphabetical order in the data collection, data items are commonly ordered (and thus numbered) within the data collection in descending order of what is known in the art as their "query-independent relevance" (hereinafter abbreviated to "QIR"). QIR is a system-calculated heuristic parameter defined in such a way that the data items with a higher QIR value are statistically more likely to be considered by a search requester of any search query as sufficiently relevant to them. The data items in the data collection will be ordered so that those with a higher QIR value will be found first when a search is done. They will thus appear at (or towards) the beginning of the search result list (which is typically shown in various pages, with those results at the beginning of the search result list being shown on the first page). Thus, each posting list in the inverted index will contain postings, a list of references to data items containing the term with which that posting list is associated, with the postings being ordered in descending QIR value order. (This is very commonly the case in respect of web search engines.).

It should be evident, however, that such a heuristic QIR parameter may not provide for an optimal ordering of the search results in respect of any given specific query, as it will clearly be the case that a data item which is generally relevant in many searches (and thus high in terms of QIR) may not be specifically relevant in any particular case. Further, the relevance of any one particular data item will vary between searches. Because of this, conventional search engines implement various methods for filtering, ranking and/or reordering search results to present them in an order that is believed to be relevant to the particular search query yielding those search results. This is known in the art as "query-specific relevance" (hereinafter abbreviated "QSR"). Many parameters are typically taken into account when determining QSR. These parameters include: various characteristics of the search query; of the search requester; of the data items to be ranked; data having been collected during (or, more generally, some "knowledge" learned from) past similar search queries.

Thus, the overall process of executing a search query can be considered as having two broad distinct stages: A first stage wherein all of the search results are collected based (in part) on their QIR values, aggregated and ordered in descending QIR order; and a second stage wherein at least some of the search results are reordered according to their QSR. Afterwards a new QSR-ordered list of the search results is created and delivered to the search requester. The search result list is typically delivered in parts, starting with the part containing the search results with the highest QSR.

Typically, in the first stage, the collecting of the search results stops after some predefined maximum number of results has been attained or some predefined minimum QIR threshold has been reached. This is known in the art as "pruning"; and it occurs, as once the pruning condition has been reached, it is very likely that the relevant data items have already been located.

Typically, in the second stage, a shorter, QSR-ordered, list (which is a subset of the search results of the first stage) is produced. This is because a conventional web search engine, when conducting a search of its data collection (which contains several billions of data items) for data items satisfying a given search query, may easily produce a list of tens of thousands of search results (and even more in some cases). Obviously the search requester cannot be provided with such an amount of search results. Hence the great importance of narrowing down the search results actually provided to the requester to a few tens of result items that are potentially of highest relevance to the search requester.

In order to address the ranking needs required for proper operations of web search engines such as, for example but without being limited thereto, the generation of QIR values and/or QSR values, multiple constructions of ranking models have been developed over the recent years. These ranking models may enable ranking of documents (e.g., web pages, text files, image files and/or video files) according to one or more parameters. Under some approaches, machine-learning algorithms are used for construction and operations of ranking models and are typically referred to as Machine-learned ranking (hereinafter abbreviated to "MLR"). As one person skilled in the art of the present technology may appreciate, MLR is not limited to web search engines per se but may be applicable to a broad range of information retrieval systems.

SUMMARY

Ranking Relying on MLR Models

Under some approaches, the ranking generated by a MLR model may consist of a ranking value associated with a document that may equally be referred to as a "parameter of interest" or "label" or "click-through rate (CTR)". The document may equally be referred to as a file. The ranking may consist of an "absolute ranking" of an absolute order of a first document compared to a second document such as, for example, the QIR value. In some other instances, the ranking may consist of a "relative ranking" of a relative order of the first document compared to the second document given a particular context such as, for example, the QSR value. In order to associate documents with parameters of interest, MLR models may, in some instances, be generated and maintained through machine-learning algorithms relying on one or more training samples. The number of MLR models that is required for particular application may greatly vary. Conventional web search engines such as Yandex™ may rely on several thousands of MLR models that may be used in parallel during processing of search queries.

In some instances, MLR models may rely on tree models and feature vectors comprising one or more parameters to associate a document (e.g., a web page) and a parameter of interest (e.g., a ranking value). The one or more parameters of a feature vector may be used to define a specific path in a tree model thereby allowing identification of which parameter of interest is to be associated with a particular document. Under some approaches, the one or more parameters may be of different types such as binary type, integer type and/or category type. As an example, the '563 application depicts a system hosting a tree model for the purpose of associating a document and a parameter of interest. The tree model may be mathematically described as comprising one or more functions h(q,d) wherein q-d associates "query" and "document". The tree model comprises a set of factors. Each factor of the set of factors is represented as one or more nodes in the tree model. Each factor of the set of factors is associated with logic allowing determining which one of the branches associated with the node is to be followed for a given document. As an example, the one or more parameters of the feature vector associating a document and a parameter of interest are "compared" to the set of factors so as to establish a path in the tree model based on values of the one or more parameters. The logic of the set of factors may allow comparing parameters of various types such as binary type, integer type and/or category type. In some instances, a MLR model may require a plurality of tree models defining the MLR model. In such instances, the MLR model may be mathematically described as multiple functions hi(q,d) wherein q-d associates "query" and "document" and i associate the function with one tree model amongst a plurality of tree models defining the MLR model. Under such convention, a tree model may be identified by a function hi(q,d) wherein i corresponds to the tree model.

Generation of Tree Models

Tree models associating a document with a parameter of interest may be generated according to various methodologies. Those methodologies allow selecting and organising the set of factors defining the tree model (i.e., selecting and organising the nodes vis-à-vis one another) and/or selecting and organising the set of factors so as to define a plurality of tree models. The tree models may be associated to define a model, such as, but without being limited thereto, a MLR model. One of such methodologies to select and organise the set of factors comprises using a so-called "greedy" algorithm. In accordance with the greedy algorithm, upon generating a tree model, a factor is selected from the set of factors to be positioned at a particular level of the tree model (i.e., so as to define a node of the tree model). The selection of the factor from the set of factors is made by a heuristic function which aims at maximizing the "quality" of the tree model. In other words, a first factor may be selected over a second factor for a particular level of the tree model because the greedy algorithm determines that selecting the first factor for the particular level of the tree model instead of the second factor will allow generating a tree model which will have, according to the heuristic function, a better quality than if the second factor is selected. It should be appreciated that the term "quality" refers to a metric that allows assessment of an accuracy of the tree model. The term "quality" may, in some instances, refer to an accuracy of the tree model, a reliability of the tree model and/or an error rate of the tree model. In some instances, the quality may be expressed as an accuracy of the function hi(q,d) wherein i represents a given tree model (i.e., a given sub-set of factors selected and organised so as to define the given tree model). The accuracy of the function h(q,d) may, in such instances, represent an ability of the machine-learning model to make a more accurate prediction. In other words, the higher the accuracy of the function h(q,d) the more accurate the machine-learning model and vice-versa.

In some instances, the greedy algorithm generates a tree model using some or all of the factors that are comprised in a set of factors. In some instances, the greedy algorithm generates a first tree model using a first sub-set of factors selected from the set of factors and a second tree model using a second sub-set of factors selected from the set of factors. In some instances, the first sub-set of factors and the second sub-set of factors may include at least one factor in common. In some instances, the first sub-set of factors and the second sub-set of factors do not include any factor in common. As an example, the greedy algorithm selects 6 factors amongst a set of factors to generate a first tree model referred to as h1(q,d), the 6 factors are selected and organised vis-à-vis one another so as to form the first tree model. Each one of the 6 factors represents one or more of the 6 nodes of the first tree model. The greedy algorithm then selects 6 factors (amongst which some may be, but not necessarily, common to the 6 factors selected for the first tree model) to generate a second tree model referred to as h2(q,d).

Under some approaches, a machine-learning model is generated by a system on the basis of a training set of objects and/or a testing set of objects. Such machine-learning model may be, but without being limitative, a MLR model used to associate a document to a parameter of interest. As detailed in the above paragraphs, the system generating the machine-learning model may rely on various methodologies and/or algorithms to generate one or more tree models that define the machine-learning model. Even though relying on the greedy algorithm to generate multiple tree models, may provide acceptable results for certain fields, such as the field of search engines, this solution may present certain limits and/or problems, at least under certain operating conditions.

The inventor(s) have determined that the above described solutions present at least two problems that will be discussed in greater details below. Those two problems may be referred to as (1) comprehension of the machine-learning model and (2) overfitting of the machine-learning model.

Comprehension of the Machine-Learning Model

The comprehension of the machine-learning model refers to one or more combinations of factors selected from a set of factors to generate one or more tree models forming the machine-learning models. As a general rule, the more combinations of factors in the one or more tree models, the better the quality of the machine-learning model and, as a result, the better the comprehension of the machine-learning model. Methodologies and/or algorithms used to select one or more combinations of factors may result, at least under certain operating conditions, in a non-optimal comprehension. As an example, algorithms such as the greedy algorithm may result in a selection of sub-sets of factors from a set of factors that are "too similar" between the multiple tree models forming the machine-learning models. "Too similar" refers to a situation wherein a first sub-set of factors associated with a first tree model and a second sub-set of factors comprise "too many" common factors which can also be described as a too important overlap between the factors of the first tree model and the factors of the second tree model. In some instances, some factors from the set of factors may even be completely disregarded and therefore never selected to generate the tree models. One of the reasons associated with this situation may be explained by the facts that some algorithms, such as the greedy algorithm, are designed to select a "best" factor for a given level of a tree model based on a determination that a "factor" is more likely to be a "better" factor even though such determination on a factor-by-factor basis may result in a lower overall quality of the tree model. This situation may be even more prevalent wherein certain factors are inherently "strong" factors (i.e., with an important positive impact in the quality of the tree model) even though they are not selected as such by the existing algorithms Such factors may include factors of integer type and/or category type that are typically associated with more than two branches upon being selected as a node in one of the tree models (as opposed to factors of binary type that are typically associated with no more than two branches upon being selected as a node in one of the tree models).

Overfitting of the Machine-Learning Model

In some instances, the algorithms used to generate the machine-learning model, such as the greedy algorithm, may generate a so-called overfitting problem. Such problem may be characterised in occurrences of unreliable patterns between values generated by a function h(q,d) and factors associated with the function h(q,d). The overfitting problem may occur when the algorithm generating the one or more tree models forming the machine-learning model tend to select and organize the factors by "memorizing" a set of training objects only relevant to the set of training objects rather than developing "trend" based on the set of training objects which will be relevant to unseen objects (i.e., the objects that are not part of the machine-learning model) and not just to the training objects of the set of training objects.

The present technology is envisaged to provide non-limiting embodiments which aim to generate prediction models, such as machine-learning models, that have an improved level accuracy by addressing, at least partially the problem of (1) computational power and energy necessary for training a decision tree prediction model using known cross-validation and/or (2) overfitting of the machine-learning model. Such improved methods while providing an improved accuracy allows a better management of physical resources of a machine-learning system on which one or more machine-learning models are being generated. Such physical resources may be a processing unit such as, but not limited to, a Central Processing Unit (CPU) and/or a memory, such as, but not limited to, a Random Access Memory (RAM).

The present technology arises from a first observation made by the inventor(s) that during generation of a tree model, a subset of random parameters of interest may be associated with parameters of interest of a given leaf of the preliminary tree model to determine an accuracy parameter of the preliminary tree model. The subset of random parameters may be generated by a CPU of a system generating the preliminary tree model while maintaining a usage of the CPU processing power below an acceptable threshold. The determination of the accuracy parameter of the preliminary model tree may be stored in a RAM of the system and relied upon by the CPU to generate a tree model. The determination of the accuracy parameter may be conducted by the CPU while maintaining the usage of the CPU processing power below an acceptable threshold.

The present technology thereby results, amongst other benefits, in a more accurate level of prediction of the machine-learning model allowing a computer-implemented system to (1) improve usage of computing processing power; and (2) deliver to an end user more relevant predictions.

Thus, according to one broad aspect of the present technology, there is provided a method of determining an accuracy parameter of a trained decision tree prediction model, the method being executable at a machine learning system. The method comprises: accessing, from a non-transitory computer-readable medium, the trained decision tree prediction model having been generated at least partially based on a set of training objects, each training object of the set of training objects comprising features and a parameter of interest, the trained decision tree prediction model comprising nodes associated with factors and leaves associated with parameters of interest of training objects of the set of training objects, the association between the leaves and the parameters of interest having been determined by a comparison of at least two of the factors and the features of the training objects of the set of training objects; generating, by a processor, a subset of random parameters of interest;

associating, in the non-transitory computer-readable medium, the subset of random parameters of interests with a given leaf, such that the given leaf has a combination of the parameters of interest associated with training objects having been associated to the given leaf and the subset of random parameters of interests having been associated with the given leaf: the parameters of interest associated with the given leaf having a range of values; each of the subset of random parameters of interests having been randomly picked from a range between a minimum value of the range of values and a maximum value of the range of values; determining, by the processor, a leaf accuracy parameter for the given leaf based on (i) the parameters of interest associated with the given leaf and (ii) the subset of random parameters of interest of the given leaf; and determining, by the processor, the accuracy parameter of the trained decision tree prediction model based on the determined leaf accuracy parameter for each of the leafs of the decision tree.

In some embodiments of the method, the comparison of the at least two of the factors and the features of the training objects comprises comparing, by the processor, conditions associated with the at least two of the factors and at least two values associated with the features of the corresponding training object.

In some embodiments of the method, the generating, by the processor, the subset of random parameters of interest comprises generating random values of a target function associated with the trained decision tree prediction model.

In some embodiments of the method, the random values are selected so as to increase an error associated with a best factor amongst the factors while maintaining a previously generated accuracy parameter of the trained decision tree prediction model below a minimum threshold, the best factor amongst the factors being determined as the factor maximizing the previously generated accuracy parameter of the trained decision tree prediction model.

In some embodiments of the method, the subset of random parameters of interest comprises a number of random parameters of interest equals to a number of parameters of interest of the given leaf with which the subset of random parameters of interest is associated.

In some embodiments of the method, the determining, by the processor, the accuracy parameter of the trained decision tree prediction model based on the determined leaf accuracy parameter comprises determining a total error in the leaves in accordance with the formula:

$$\sum_{j=1}^{M}\left[\left(\sum_{i\in b_j} target_i\right)^2 - \sum_{i=1}^{N_j} target_i^2\right] \times \log(N_j + 1)$$

wherein M is a number of leaves and Nj is a number of parameters of interest associated with a j-th leaf, and bj is a number of random parameters of interest associated with the j-th leaf.

In some embodiments of the method, wherein the number of parameters of interest associated with the j-th leaf is equal to a number of training objects associated with the j-th leaf.

In some embodiments of the method, the determining, by the processor, the accuracy parameter of the trained decision tree prediction model is based on a plurality of determined leaf accuracy parameters, each one of the plurality of determined leaf accuracy parameters being associated with a distinct leaf.

In some embodiments of the method, the features are indicative of at least one of a number of clicks, a number of views, a document ranking, a URL, a domain name, an IP address, a search query and a key word.

In some embodiments of the method, the parameter of interest is indicative of at least one of a search result prediction, a probability of click, a document relevance, a user interest, a URL, a number of clicks and a click-through rate (CTR).

In some embodiments of the method, the accuracy parameter of the trained decision tree prediction model is reflective of an accuracy of a target function associated with the trained decision tree prediction model.

In some embodiments of the method, each one of the factors is associated with one of (i) a condition applicable to a binary feature, (ii) a condition applicable to a numerical feature and (iii) a condition applicable to a categorical feature.

In some embodiments of the method, the trained decision tree prediction model has been generated by executing: accessing, from a non-transitory computer-readable medium, a set of factors; identifying, by the processor, from the set of factors, a factor associated with a best accuracy parameter of a preliminary trained decision tree prediction model for a given position of a node associated with the factor in the preliminary trained decision tree prediction model, the best accuracy parameter of the preliminary trained decision tree prediction model being selected amongst a plurality of accuracy parameters of a plurality of preliminary decision tree prediction models as the highest accuracy parameter thereamong, wherein a given one of the plurality of accuracy parameters of a respective given one of the plurality of preliminary decision tree prediction models was determined based on a leaf accuracy parameter; associating, by the processor, the factor with the given position of the node of the trained decision tree prediction model to be generated; and generating, by the processor, the trained decision tree prediction model, the trained decision tree prediction model comprising the node associated with the factor for the given position.

In some embodiments of the method, each one of the plurality of accuracy parameters is associated with a corresponding one of the plurality of preliminary decision tree prediction models.

In some embodiments of the method, the method further comprises: identifying, by the processor, from the set of factors, an other factor associated with a best accuracy parameter of another preliminary trained decision tree prediction model for another given position of another node associated with the other factor in the other preliminary trained decision tree prediction model; and associating, by the processor, the other factor with the other given position of the other node of the trained decision tree prediction model to be generated.

In some embodiments, the trained decision tree prediction model further comprises the other node associated with the other factor for the other given position.

According to yet another broad aspect of the current technology, there is provided A method of determining an accuracy parameter of a trained decision tree prediction model, the method being executable at a machine learning system. The method comprises: accessing, from a non-transitory computer-readable medium, a set of training objects, each training object of the set of training objects comprising features and a parameter of interest; generating, by a processor, the trained decision tree prediction model at least partially based on a set of training objects, each training object of the set of training objects comprising features and a parameter of interest, the trained decision tree prediction model comprising nodes associated with factors and leaves associated with parameters of interest of training objects of the set of training objects, the association between the leaves and the parameters of interest having been determined by a comparison of at least two of the factors and the features of the training objects of the set of training objects; generating, by the processor, a subset of random parameters of interest; associating, in the non-transitory computer-readable medium, the subset of random parameters of interests with a given leaf, such that the given leaf has a combination of the parameters of interest associated with training objects having been associated to the given leaf and the subset of random parameters of interests having been associated with the given leaf: the parameters of interest associated with the given leaf having a range of values; each of the subset of random parameters of interests having been randomly picked from a range between a minimum value of the range of values and a maximum value of the range of values; determining, by the processor, a leaf accuracy parameter based on (i) the parameters of interest associated with the given leaf and (ii) the subset of random parameters of interest of the given leaf; and determining, by the processor, the accuracy parameter of the trained decision tree prediction model based on the determined leaf accuracy parameter for each of the leafs of the decision tree.

According to further yet another broad aspect of the present technology, there is provided a computer-implemented system for determining an accuracy parameter of a trained decision tree prediction model. The system comprises: a non-transitory computer-readable medium; and a processor. The processor is configured to perform: accessing, from a non-transitory computer-readable medium, the trained decision tree prediction model having been generated at least partially based on a set of training objects, each training object of the set of training objects comprising features and a parameter of interest, the trained decision tree prediction model comprising nodes associated with factors and leaves associated with parameters of interest of training objects of the set of training objects, the association between the leaves and the parameters of interest having been determined by a comparison of at least two of the factors and the features of the training objects of the set of training objects; generating, by a processor, a subset of random parameters of interest; associating, in the non-transitory computer-readable medium, the subset of random parameters of interests with a given leaf, such that the given leaf has a combination of the parameters of interest associated with training objects having been associated to the given leaf and the subset of random parameters of interests having been associated with the given leaf: the parameters of interest associated with the given leaf having a range of values; each of the subset of random parameters of interests having been randomly picked from a range between a minimum value of the range of values and a maximum value of the range of values; determining, by the processor, a leaf accuracy parameter for the given leaf based on (i) the parameters of interest associated with the given leaf and (ii) the subset of random parameters of interest of the given leaf; and determining, by the processor, the accuracy parameter of the trained decision tree prediction model based on the determined leaf accuracy parameter for each of the leafs of the decision tree.

In some embodiments of the system, the subset of random parameters of interest comprises a number of random parameters of interest equals to a number of parameters of interest of the given leaf with which the subset of random parameters of interest is associated.

In some embodiments of the system, the determining, by the processor, the accuracy parameter of the trained decision tree prediction model based on the determined leaf accuracy parameter comprises determining a total error in the leaves in accordance with the formula:

$$\sum_{j=1}^{M}\left[\left(\sum_{i\in b_j} target_i\right)^2 - \sum_{i=1}^{N_j} target_i^2\right] \times \log(N_j + 1)$$

wherein M is a number of leaves and Nj is a number of parameters of interest associated with a j-th leaf, and bj is a number of random parameters of interest associated with the j-th leaf.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein. Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
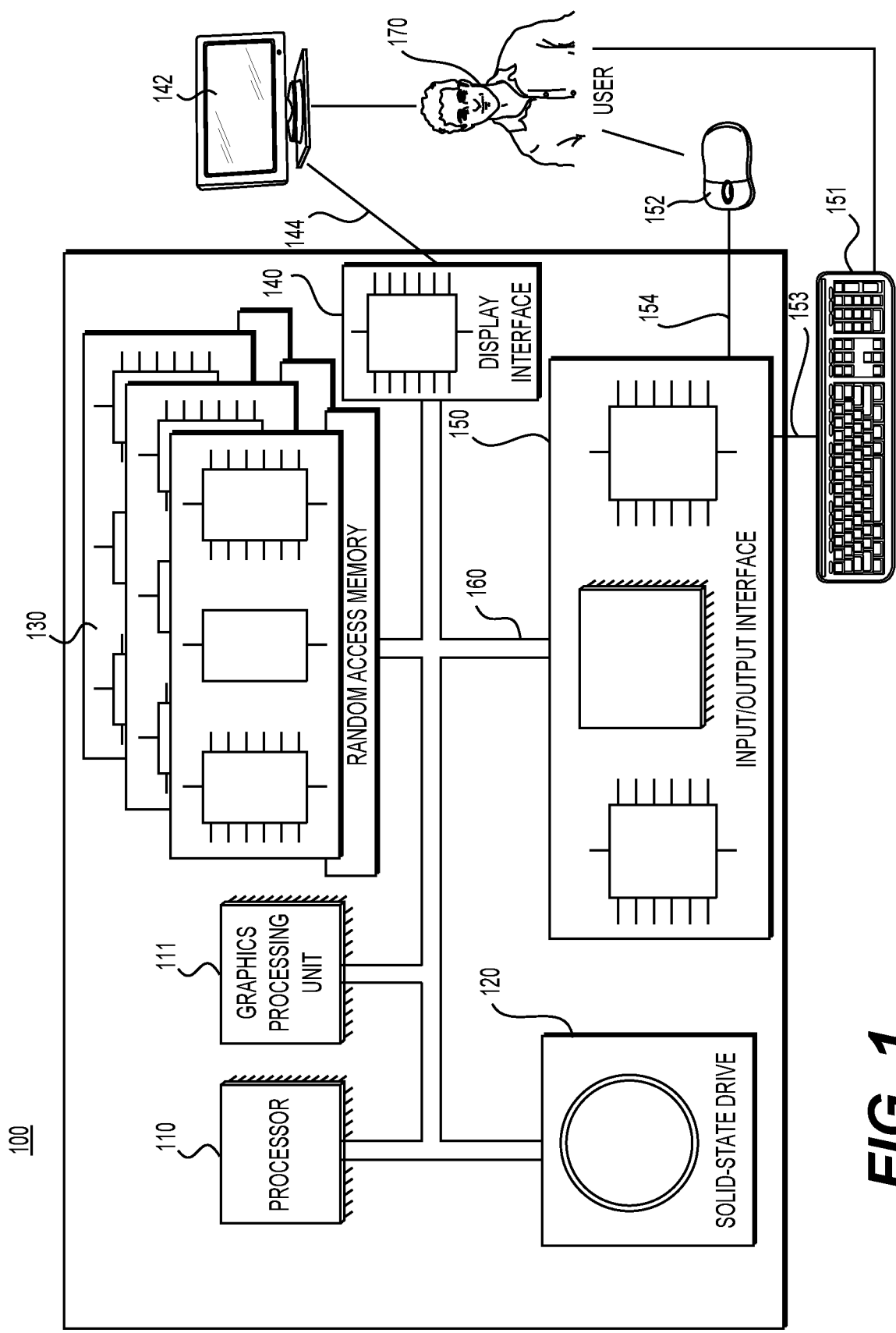
FIG. 1 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 suitable for use with some implementations of the present technology, the computer system 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a user 170, and the input/output interface 150 may be coupled to a touchscreen (not shown), a keyboard 151 (e.g. via a USB cable 153) and a mouse 152 (e.g. via a USB cable 154), each of the keyboard 151 and the mouse 152 being operable by the user 170.

According to implementations of the present technology, the solid-state drive 120 stores program instructions suitable for being loaded into the random access memory 130 and executed by the processor 110 and/or the GPU 111 for processing activity indications associated with a user. For example, the program instructions may be part of a library or an application.

Figure 2:
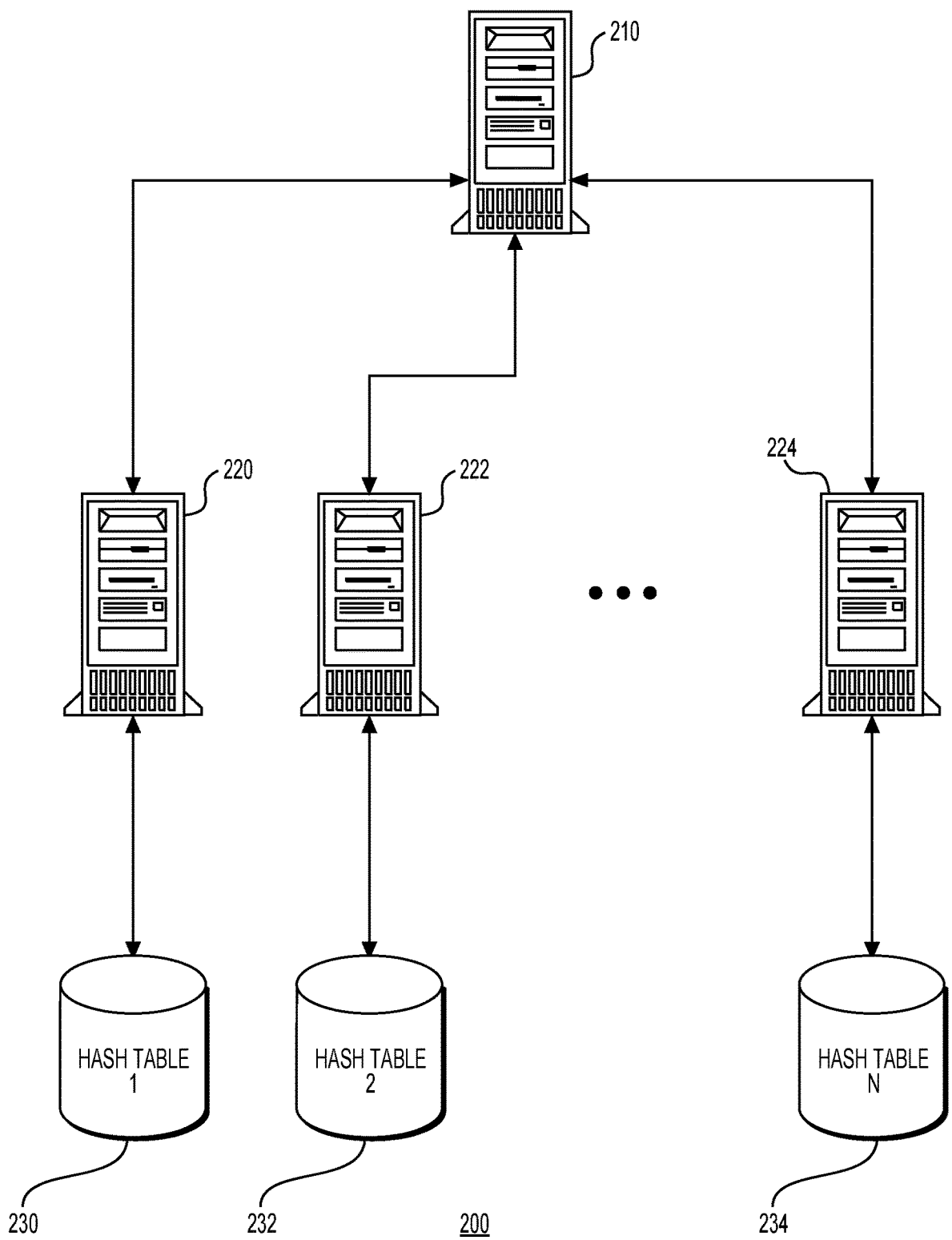
FIG. 2 is a diagram of a networked computing environment in accordance with an embodiment of the present technology.

In FIG. 2, there is shown a networked computing environment 200 suitable for use with some implementations of the present technology, the networked computing environment 200 comprising a master server 210 in communication with a first slave server 220, a second slave server 222 and a third slave server 224 (also referred to as the slave servers 220, 222, 224 hereinafter) via a network (not depicted) enabling these systems to communicate. In some non-limiting embodiments of the present technology, the network can be implemented as the Internet. In other embodiments of the present technology, the network may be implemented differently, such as any wide-area communications network, local-area communications network, a private communications network and the like.

The networked computing environment 200 may contain more or fewer slave servers without departing from the scope of the present technology. In some embodiments, no "master server—slave server" configuration may be required, a single server may be sufficient. The number of servers and the type of architecture is therefore not limitative to the scope of the present technology.

In one embodiment, a communication channel (not depicted) between the master server 210 and the slave servers 220, 222, 224 may be established to allow data exchange. Such data exchange may occur on a continuous basis or, alternatively, upon occurrence of certain events. For example, in the context of crawling webpages and/or processing a search query, a data exchange may occur as a result of the master server 210 overseeing the training of machine-learning models by the networked computing environment. In some embodiments, the master server 210 may receive a set of training objects and/or a set of testing objects and/or a set of factors from a frontend search engine server (not depicted) and send the set of training objects and/or the set of testing objects and/or the set of factors to one or more of the slave servers 220, 222, 224. Once received from the master server 210, the one or more slave servers 220, 222, 224 may process the set of training objects and/or the set of test objects and/or the set of factors in accordance with the present technology to generate one or more machine-learning models, each one of the machine-learning models comprising, in some instances, one or more tree models. In some embodiments, the one or more tree models model an association between the document and the parameter of interest. A generated machine-learning model may be transmitted to the master server 210 so that the master server 210 may generate a prediction, for example in the context of a search query received from the frontend search engine server, based on the search query. Upon applying the search query to the generated machine-learning model, the master server 210 may transmit one or more corresponding results to the frontend search engine server. In some alternative embodiments, the one or more slave servers 220, 222, 224 may directly host the generated machine-learning model and process a search query received from the frontend search engine server through the master server 210.

The master server 210 can be implemented as a conventional computer server and may comprise some or all of the features of the computer system 100 depicted at FIG. 1. In an example of an embodiment of the present technology, the master server 210 can be implemented as a Dell™ PowerEdge™ Server running the Microsoft™ Windows Server™ operating system. Needless to say, the master server 210 can be implemented in any other suitable hardware and/or software and/or firmware or a combination thereof. In the depicted non-limiting embodiment of present technology, the master server 210 is a single server. In alternative non-limiting embodiments of the present technology, the functionality of the master server 210 may be distributed and may be implemented via multiple servers.

The implementation of the master server 210 is well known to the person skilled in the art of the present technology. However, briefly speaking, the master server 210 comprises a communication interface (not depicted) structured and configured to communicate with various entities (such as the frontend search engine server and/or the slave servers 220, 222, 224, for example and other devices potentially coupled to the network) via the network. The master server 210 further comprises at least one computer processor (e.g., a processor 110 of the master server 210) operationally connected with the communication interface and structured and configured to execute various processes to be described herein.

The general purpose of the master server 210 is to coordinate the generation of machine-learning models by the slave servers 220, 222, 224. As previously described, in an embodiment, the set of training objects and/or the set of testing objects and/or the set of factors may be transmitted to some or all of the slave servers 220, 222, 224 so that the slave servers 220, 222, 224 may generate one or more machine-learning models based on the set of training objects and/or the set of testing objects and/or the set of factors. In some embodiments, a machine-learning model may comprise one or more tree models. Each one of the tree models may be hosted on one of the slave servers 220, 222, 224. In some alternative embodiments, the tree models may be hosted on at least two of the slave servers 220, 222, 224. As a person skilled in the art of the present technology will appreciate, where the machine-learning model and/or the tree models forming the machine-learning model are hosted is not critical to the present technology and many variations may be envisioned without departing from the scope of the present technology.

In some embodiments, once the slave servers 220, 222, 224 host the one or more generated machine-learning model, the slave servers 220, 222, 224 may receive instructions to conduct associations between a document and a parameter of interest, the document being a different object from the training objects of the set of training objects and comprising a set of parameters corresponding to values associated with some factors selected from the set of factors defining a structure of at least one of the tree model. Once the association between the document and the parameter of interest has been completed by the slave servers 220, 222, 224, the master server 210 may receive, from the slave servers 220, 222, 224, the parameter of interest to be associated with the document. In some other embodiments, the master server 210 may be limited to sending a document and/or the set of parameters associated with the document without receiving any parameter of interest in return. This scenario may occur upon determination by one or more of the slave servers 220, 222, 224 that the document and/or the set of parameters associated with the document leads to modification of one of the tree models hosted on the slave servers 220, 222, 224. In some embodiments, the master server 210 may comprise logic which may generate instructions to modify the one or more tree models hosted at the slave servers 220, 222, 224 along with a parameter of interest to be associated with the document. In such instances, one of the tree models hosted by the slave servers 220, 222, 224 may be modified so that the document may be associated with the parameter of interest in the tree model. In some embodiments, once one of the tree models hosted by the slave servers 220, 222, 224 has been modified, the slave servers 220, 222, 224 may transmit a message to the master server 210, the message being indicative of a modification made to one of the tree models. Other variations as how the master server 210 interacts with the slave servers 220, 222, 224 may be envisioned without departing from the scope of the present technology and may become apparent to the person skilled in the art of the present technology. In addition, it should be also expressly understood that in order to simplify the description presented herein above, the configuration of the master server 210 has been greatly simplified. It is believed that those skilled in the art will be able to appreciate implementational details for the master server 210 and for components thereof that may have been omitted for the purposes of simplification of the description.

The slave servers 220, 222, 224 can be implemented as conventional computer servers and may comprise some or all of the features of the computer system 100 depicted at FIG. 1. In an example of an embodiment of the present technology, the slave servers 220, 222, 224 can be implemented as a Dell™ PowerEdge™ Server running the Microsoft™ Windows Server™ operating system. Needless to say, the slave servers 220, 222, 224 can be implemented in any other suitable hardware and/or software and/or firmware or a combination thereof. In the depicted non-limiting embodiment of present technology, the slave servers 220, 222, 224 operate on a distributed architecture basis. In alternative non-limiting embodiments, a single slave server may be relied upon to operate the present technology.

The implementation of the slave servers 220, 222, 224 is well known to the person skilled in the art of the present technology. However, briefly speaking, each one of the slave servers 220, 222, 224 may comprise a communication interface (not depicted) structured and configured to communicate with various entities (such as the frontend search engine server and/or the master server 210, for example and other devices potentially coupled to the network) via the network. Each one of the slave servers 220, 222, 224 further comprises at least one computer processor (e.g., similar to the processor 110 depicted at FIG. 1) operationally connected with the communication interface and structured and configured to execute various processes to be described herein. Each one of the slave servers 220, 222, 224 further may comprise one or more memories (e.g., similar to the solid-state drive 120 and/or the random access memory 130 depicted at FIG. 1).

The general purpose of the slave servers 220, 222, 224 is to generate the one or more machine-learning models. As previously described, in an embodiment, the machine-learning models may comprise one or more tree models. Each one of the tree models comprises a set of factors (which may also be referred to as a subset of factors if the factors forming the subset has been selected from a set of factors). Each factor of the set of factors corresponds to one or more nodes of a corresponding tree model. During the generation of the one or more machine-learning models, the slave servers 220, 222, 224 may rely on the set of training objects and/or the set of testing objects to select and organise the factors so as to generate a tree model. This process of selecting and organizing the factors may be repeated throughout multiple iterations so that the slave servers 220, 222, 224 generate multiple tree models, each one of the tree models corresponding to a different selection and/or organization of the factors. In some embodiments, the set of training objects and/or the set of testing objects and/or the set of factors may be received from the master server 210 and/or the frontend server. Once the machine-learning models have been generated, the slave servers 220, 222, 224 may transmit to the master server 210 an indication that the machine-learning models have been generated and may be relied upon to generate predictions, for example, but without being limitative, in the context of classifying documents during a "web crawling" process and/or upon processing a search query received from through the frontend search engine server.

In some embodiments, the slave servers 220, 222, 224 may also receive a document and a set of parameters associated with the document along with a parameter of interest to be associated with the document. In some other embodiments, the slave servers 220, 222, 224 may not transmit any parameter of interest to the master server 210. This scenario may occur upon determination by the slave servers 220, 222, 224 that the parameter of interest to be associated with the document leads to a modification of one of the tree models that they host. In some embodiments, once one of the tree models hosted by the slave servers 220, 222, 224 has been modified, the slave servers 220, 222, 224 may transmit a message to the master server 210, the message being indicative of a modification made to one of the tree models. Other variations as how the slave servers 220, 222, 224 interact with the master server 210 may be envisioned without departing from the scope of the present technology and may become apparent to the person skilled in the art of the present technology. In addition, it should be also expressly understood that in order to simplify the description presented herein above, the configuration of the slave servers 220, 222, 224 has been greatly simplified. It is believed that those skilled in the art will be able to appreciate implementational details for the slave servers 220, 222, 224 and for components thereof that may have been omitted for the purposes of simplification of the description.

Still referring to FIG. 2, the slave servers 220, 222, 224 may each be communicatively coupled to "hash table 1" database 230, "hash table 2" database 232 and "hash table n" database 234 (referred to as "the databases 230, 232, 234"

hereinafter). The databases 230, 232, 234 may be part of the slave servers 220, 222, 224 (e.g., stored in the memories of the slave servers 220, 222, 224 such as the solid-state drive 120 and/or the random access memory 130) or be hosted on distinct database servers. In some embodiments, a single database accessed by the slave servers 220, 222, 224 may be sufficient. The number of databases and the arrangement of the databases 230, 232, 234 are therefore not limitative to the scope of the present technology. The databases 230, 232, 234 may be used to access and/or store data relating to one or more hash tables representative of machine-learning models such as, but without being limited thereto, tree models generated in accordance with the present technology. In some embodiments, the databases 230, 232, 234 may be accessed by the slave servers 220, 222, 224 to identify a parameter of interest to be associated with the document further to the processing of set of parameters associated with the document by the slave servers 220, 222, 224 in accordance with the present technology. In some other embodiments, the databases 230, 232, 234 may be accessed by the slave servers 220, 222, 224 to store a new entry (also referred to as a "hashed complex vector" and/or "key" hereinafter) in the one or more hash tables, the new entry having been generated further to the processing of the set of parameters associated with the document and being representative of a parameter of interest to be associated with the document. In such embodiments, the new entry may be representative a modification made to a tree models model by the hash table. Even though FIG. 2 illustrates an embodiment wherein the databases 230, 232, 234 comprise hash tables, it should be understood that alternative embodiments as to how machine-learning models may be stored may be envisioned without departing from the scope of the present technology.

More details regarding how the tree models forming a machine-learning model are processed will be provided in connection with the description of FIGS. 3 to 7.

Figure 3:
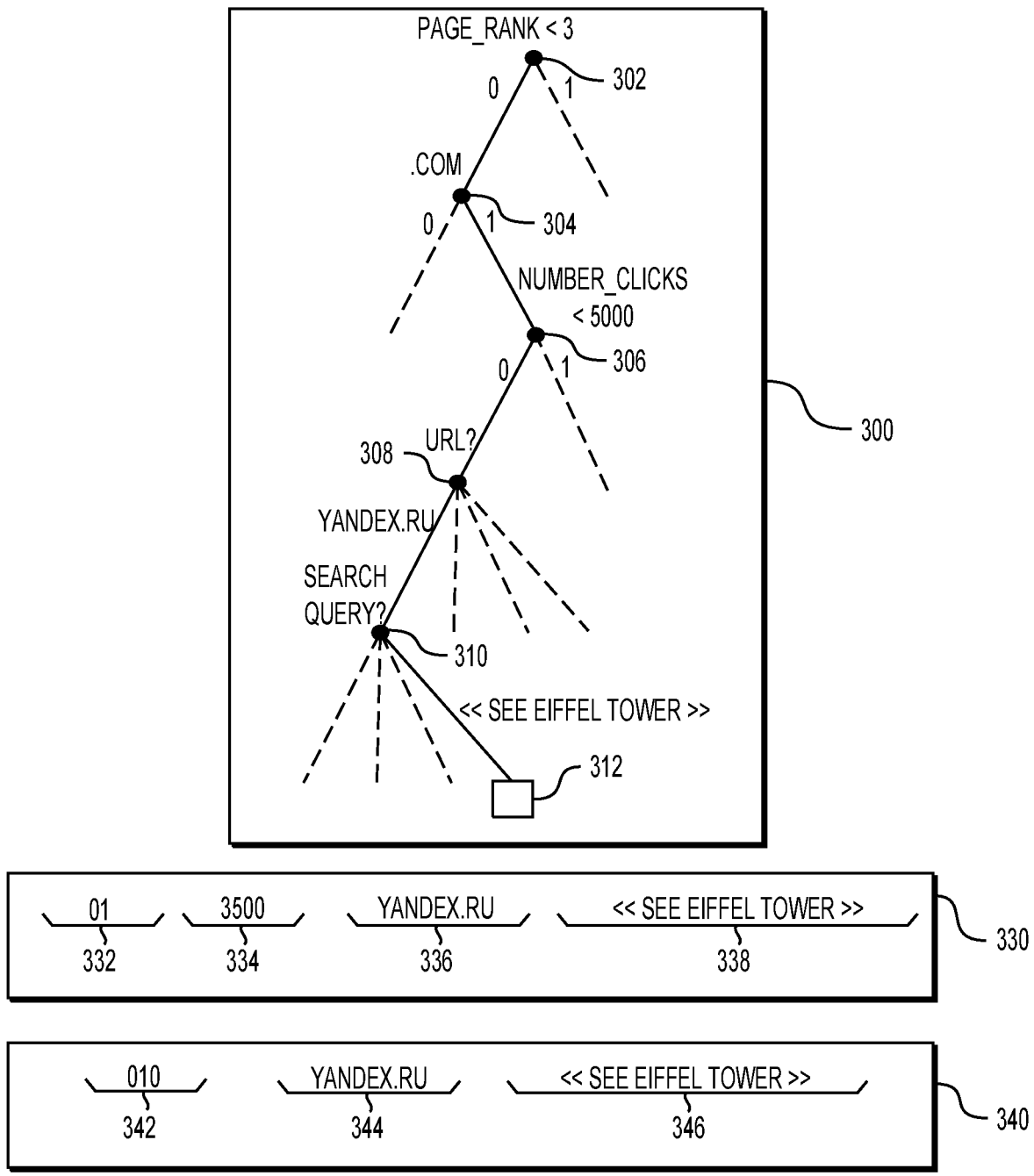
FIG. 3 is a diagram illustrating a partial tree model and two exemplary feature vectors in accordance with an embodiment of the present technology.

Turning now to FIG. 3, a partial tree model 300, a first set of parameters 330 and a second set of parameters 340 are depicted. The first set of parameters 330 and the second set of parameters 340 may equally be referred to as feature vectors. The partial tree model 300 may have been generated in accordance with the present technology and may model an association between a document and a parameter of interest. The tree model 300 may be referred to as a machine-learning model or a portion of a machine-learning model (e.g., for implementations wherein the machine-learning model relies on multiple tree models). In some instances, the tree model 300 may be referred as a prediction model or a portion of a prediction model (e.g., for implementations wherein the prediction model relies on multiple tree models).

The document may take multiple forms and formats to represent documents of various natures, such as, but without being limitative, text files, text documents, web pages, audio files, video files and so on. The document may equally be referred to as a file without departing from the scope of the present technology. In an embodiment, the file may be a document searchable by a search engines. However, multiple embodiments may be envisioned without departing from the scope of the present technology and may become apparent to the person skilled in the art of the present technology. As previously discussed, the parameter of interest may take multiple forms and formats to represent an indication of an order or ranking of a document such as a "click-through rate (CTR)", for example, but without being limitative. In some embodiments, the parameter of interest may be referred to as a label and/or a ranking, in particular in the context of search engines. In some embodiments, the parameter of interest may be generated by a machine-learning algorithm using a training document. In some alternative embodiments, other methods may be used such as, but without being limitative manually defining the parameter of interest. How the parameter of interest is generated is therefore not limitative and multiple embodiments may be envisioned without departing from the scope of the present technology and may become apparent to the person skilled in the art of the present technology.

A path throughout the partial tree model 300 may be defined by the first set of parameters 330 and/or the second set of parameters 340. The first set of parameters 330 and the second set of parameters 340 may be associated with a same document or with different documents. The partial tree model 300 comprises multiple nodes each connected to one or more branches. In the embodiment depicted at FIG. 3, a first node 302 (or equally referred to as the first factor 302), a second node 304 (or equally referred to as the second factor 304), a third node 306 (or equally referred to as the third factor 306), a fourth node 308 (or equally referred to as the fourth factor 308) and a fifth node 310 (or equally referred to as the fifth factor 310) are depicted. Each one of the first node 302, the second node 304, the third node 306, the fourth node 308 and the fifth node 310 is associated with a condition thereby defining a so-called factor. The first node 302 is associated with a condition "if Page_rank<3" associated with two branches (i.e., true represented by a binary number "0" and false represented by a binary number "1"), the second node 304 is associated with a condition "Is main page?" associated with two branches (i.e., true represented by a binary number "0" and false represented by a binary number "1"), the third node 306 is associated with a condition "if Number_clicks<5,000" associated with two branches (i.e., true represented by a binary number "0" and false represented by a binary number "1"), the fourth node 308 is associated with a condition "which URL?" associated with more than two branches (i.e., each one of the branches is associated with a different URL, for example, the URL "yandex.ru") and the fifth node 310 is associated with a condition "which Search query?" associated with more than two branches (i.e., each one of the branches is associated with a different search query, for example, the search query "See Eiffel Tower"). In an embodiment, each one of the conditions set forth above may define a distinct factor (i.e., the first factor 302 is defined by the condition "if Page_rank<3", the second factor 304 is defined by the condition "Is main page?", the third factor 306 is defined by the condition "if Number_clicks<5,000", the fourth factor 308 is defined by the condition "which URL?" and the fifth factor 310 is defined by the condition "which Search query?"). In addition, the fifth node 310, via the branch "See Eiffel Tower" is associated with a leaf 312. In some embodiments, the leaf 312 may be indicative of a parameter of interest.

As a result of the above-described configuration, the tree model 300 defined by the specific selection and organisation of the first factor 302, the second factor 304, the third factor 306, the fourth factor 308 and the fifth factor 310 may be used to associate a document (such as, for example, but without being limitative, a web page in the html format) with the parameter of interest associated with the leaf 312, the association being defined by a path through the partial tree model 300 based on the first set of parameters 330 and/or the second set of parameters 340. It should be appreciated that for purpose of clarity, the partial tree model 300 only represents a portion of a complete tree model. The person skilled in the art of the present technology may appreciate that the number of nodes, branches and leafs is virtually unlimited and solely depend on a complexity of the tree model to be model. In addition, in some embodiments, the tree model may be an oblivious tree model comprising a set of nodes each comprising two branches (i.e., true represented by a binary number "0" and false represented by a binary number "1"). However, the present technology is not limited to oblivious tree models and multiple variations may be envisioned by the person skilled in the art of the present technology, such as for example, a tree model comprising a first portion defining an oblivious tree model and a second portion defining a non-oblivious tree model as exemplified by the tree model 300 (e.g., a first portion defined by the first node 302, the second node 304 and the third node 306 and a second portion defined by the fourth node 308 and the fifth node 310).

The first set of parameters 330 illustrates an example of parameters defining the path exemplified by the tree model 300. The set of parameters 330 may be associated with the document and allows defining the path in the tree model 300 described in the paragraph above. At least one of the parameters of the set of parameters may be of binary type and/or of real number type (e.g., integer number type, floating number type). In some embodiments, the first data may represent a path in an oblivious portion of the tree model as it is the case in the example depicted in FIG. 3. Other variations may also be possible without departing from the scope of the present technology. In the example of FIG. 3, the set of parameters comprises a first component 332 associated with a value "01" and a second component 334 associated with a value "3500". Even though the term "component" is used in the present description, it should be understood that the term "variable" may be equally used and may therefore be considered as being an equivalent to "component". The first component 332 comprises the binary sequence "01" which, once projected in the tree model 300, allows establishing a first portion of the path. In the example of FIG. 3, the first portion of the path is established by applying a first binary digit "0" of the sequence "01" to the first node 302 (i.e., the first factor 302) and then a second binary digit "1" of the sequence "01" to the second node 304 (i.e., the second factor 304). The second component 334, once project in the tree model 300, allows establishing a second portion of the path. In the example of FIG. 3, the second portion of the path is established by applying the number "3500" to the third node 306" (i.e., the third factor 306). Even though the example of FIG. 3 illustrates the first data as comprising the first component 332 and the second component 334, the number of components and the number of digits comprised by one of the components is not limitative and many variations may be envisioned without departing from the scope of the present technology.

In the example of FIG. 3, the first set of parameters also comprises a third component 336 associated with a value "yandex.ru" and a fourth component 338 associated with a value "See Eiffel Tower". The third component 336 and the fourth component 338 may be of category type. In some embodiments, third component 336 and the fourth component 338 may also be referred to as categorical features and may comprise, for example, but without being limitative, a host, an URL, a domain name, an IP address, a search query and/or a key word. In some embodiments, the third component 336 and the fourth component 338 may be broadly described as comprising label categories allowing categorisation of information. In some embodiments, the third component 336 and the fourth component 338 may take the form of a chain and/or string of characters and/or digits. In yet some embodiments, the third component 336 and the fourth component 338 may comprise a parameter that may take more than two values, as it is the case in the example of FIG. 3 thereby resulting in the tree model 300 having as many branches connected to a node as a number of possible values of the parameter. Multiple variations as to what the third component 336 and the fourth component 338 may comprise is not limitative and many variations may be envisioned without departing from the scope of the present technology. In some embodiments, the third component 336 and the fourth component 338 may represent a path in a non-oblivious portion of the tree model as it is the case in the example depicted at FIG. 3. Other variations may also be possible without departing from the scope of the present technology.

The third component 336 comprises a string of character "yandex.ru" which, once projected in the tree model 300, allows establishing a fourth portion of the path. In the example of FIG. 3, the fourth portion of the path is established by applying the string of character "yandex.ru" to the fourth node 308. The fourth component 338, once projected in the tree model 300, allows establishing a fifth portion of the path. In the example of FIG. 3, the fifth portion of the path is established by applying the string of character "See Eiffel Tower" to the fifth node 310 thereby leading to the leaf 312 and the parameter of interest associated therewith. Even though the example of FIG. 3 illustrates the third component 336 and the fourth component 338, the number of components and the number of digits and/or characters comprised by one of the components is not limitative and many variations may be envisioned without departing from the scope of the present technology.

Turning now to the second set of parameters 340, the second set of parameters 340 illustrates another example of parameters defining the path exemplified by the tree model 300. As for the first set of parameters 330, the second set of parameters 340 may be associated with the document and allows defining the path in the tree model 300 described in the paragraph above. The second set of parameters 340 is similar on all aspects to the first set of parameters 330 with the exception that the second set of parameters 340 comprises a first component 342 instead of the first component 332 and the second component 334 of the first set of parameters 330. The first component 342 comprises a sequence of digits "010" whereas the first component 332 is associated with the value "01" and the second component 334 is associated with the value "3500". As a person skilled in the art of the present technology may appreciate, in the first component 342, the value "3500" has been represented by a binary digit "0" which is the output of the value "3500" applied to the condition associated with the third node 306 (i.e., Number_clicks<5,000"). As a result, the first component 342 may be considered as an alternative representation to the first component 332 and the second component 334 of a same path in the tree model 300. As a result, in some embodiments, a real number value may be translated into a binary value in particular for cases wherein a node of a tree model to which the integer value is to be applied corresponds to an oblivious section of the tree model. Other variations may also be possible and the example of the second set of parameters 340 should not be construed as being limitative of the scope of the present technology. The second set of parameters 340 also comprise a second component 344 and a third component 346 that are identical to the third component 336 and the fourth component 338 of the first set of parameters 330.

Figure 4:
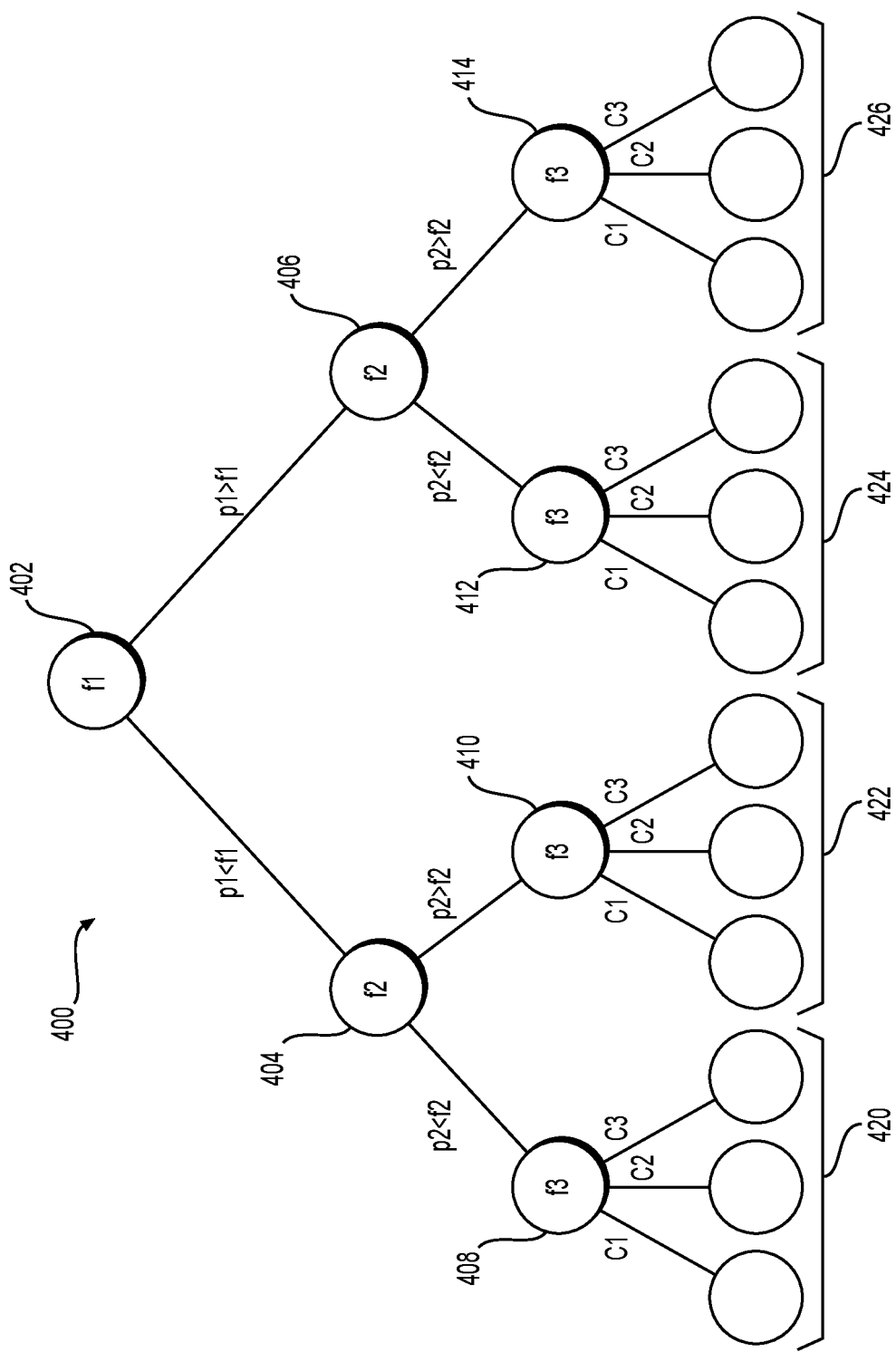
FIG. 4 is a diagram illustrating a complete tree model in accordance with an embodiment of the present technology.

Turning now to FIG. 4, an example of a complete tree model 400 is depicted. The tree model 400 aims at illustrating a generic tree model which may be modified so as to meet the requirements of a specific prediction model. Such modifications may include, for example but without being limitative, adding or removing one or more level of the tree, adding or removing nodes (i.e., factors), adding or removing branches connecting the nodes and/or the leafs of the tree. The tree model may 400 be part of a machine-learning model or be the machine-learning model. The tree model may be a preliminary tree model or a trained tree model. In some embodiments, the tree model 400 may be, once generated, be updated and/or modified to improve, for example, a level of accuracy of the machine-learning model and/or a scope of application of the machine-learning model. In some embodiments, the tree model 400 may be relied upon to process, for example, but without being limited to, search engine requests. Other fields in which the tree model 400 may be relied upon may also be envisioned without departing from the scope of the present technology.

The tree model 400 comprises a first node 402 associated with a first factor "f1". The first node 402 defines a first level of the model tree 400. The first node 402 is connected through branches to a second node 404 and a third node 406. The second node 404 and the third node 406 are both associated with a second factor "f2". The second node 404 and the third node 406 define a second level of the tree model 400. In an embodiment, the first factor "f1" has been selected amongst a set of factors to be positioned at a first level of the model tree 400 on the basis of a set of training objects. More details regarding how the selection of the factors from a set of factors is made will be provided in the sections below. The first factor "f1" is defined so that, for a given object, a value of a parameter associated with the first factor "f1" determines whether the object is to be associated with the second node 404 or the third node 406. As an example, if the value is less than a value "f1" then the object is associated with the second node 404. As another example, if the value is more than the value "f1" then the object is associated with the third node 406.

In turn, the second node 404 is associated with a fourth node 408 associated with a third factor "f3" and a fifth node 410 associated with the third factor "f3". The third node 406 is associated with a sixth node 412 associated with the third factor "f3" and a seventh node 414 associated with the third factor "f3". The fourth node 408, the fifth node 410, the sixth node 412 and the seventh node 414 define a third level of the tree model 400. As previously described in connection with the first node 402, for a given object, a value of a parameter associated with the second factor "f2" determines whether the object is to be associated with the fourth node 408 or the fifth node 410 (if the object is associated with the second node 404) or the sixth node 412 or the seventh node 414 (if the object is associated with the third node 406).

In turn, each one of the fourth node 408, the fifth node 410, the sixth node 412 and the seventh node 414 are associated with sets of parameters of interest. In the example illustrated at FIG. 4, the sets of parameters of interest comprise a first set 420, a second set 422, a third set 424 and a fourth set 426. Each one of the sets of parameters of interest comprises three parameter of interests, namely "C1", "C2" and "C3".

As a person skilled in the art of the present technology may appreciate, the tree model 400 illustrates an embodiment wherein a particular level of the tree model 400 is associated with one factor. In the example of FIG. 4, a first level comprises the first node 402 and is associated with the first factor "f1"; a second level comprises the second node 404 and the third node 406 and is associated with the second factor "f2"; and a third level comprises the fourth node 408, the fifth node 410, the sixth node 412 and the seventh node 414 and is associated with the third factor "f3". In other words, in the embodiment of FIG. 4, the first level is associated with the first factor "f1", the second level is associated with the second factor "f2" and the third level is associated with the third factor "f3". Other embodiments may however be envisioned. In particular, an alternative embodiment wherein a generated tree model may include distinct factors for a given level of the tree model. For example, a first level of such tree model may comprise a first node associated with a first factor "f1", a second level may comprise a second node associated with a second factor "f2" and a third node associated with a third factor "f3". As a person skilled in the art of the present technology may appreciate, other variations as to which factors may be associated with a given level may be envisioned without departing from the scope of the present technology.

The relevant steps taken to build an embodiment of a trained decision tree prediction model (also referred to as a "trained decision tree", "tree model" and/or a "tree decision model") will be discussed with respect to FIG. 5, FIG. 6 and FIG. 7.

Figure 5:
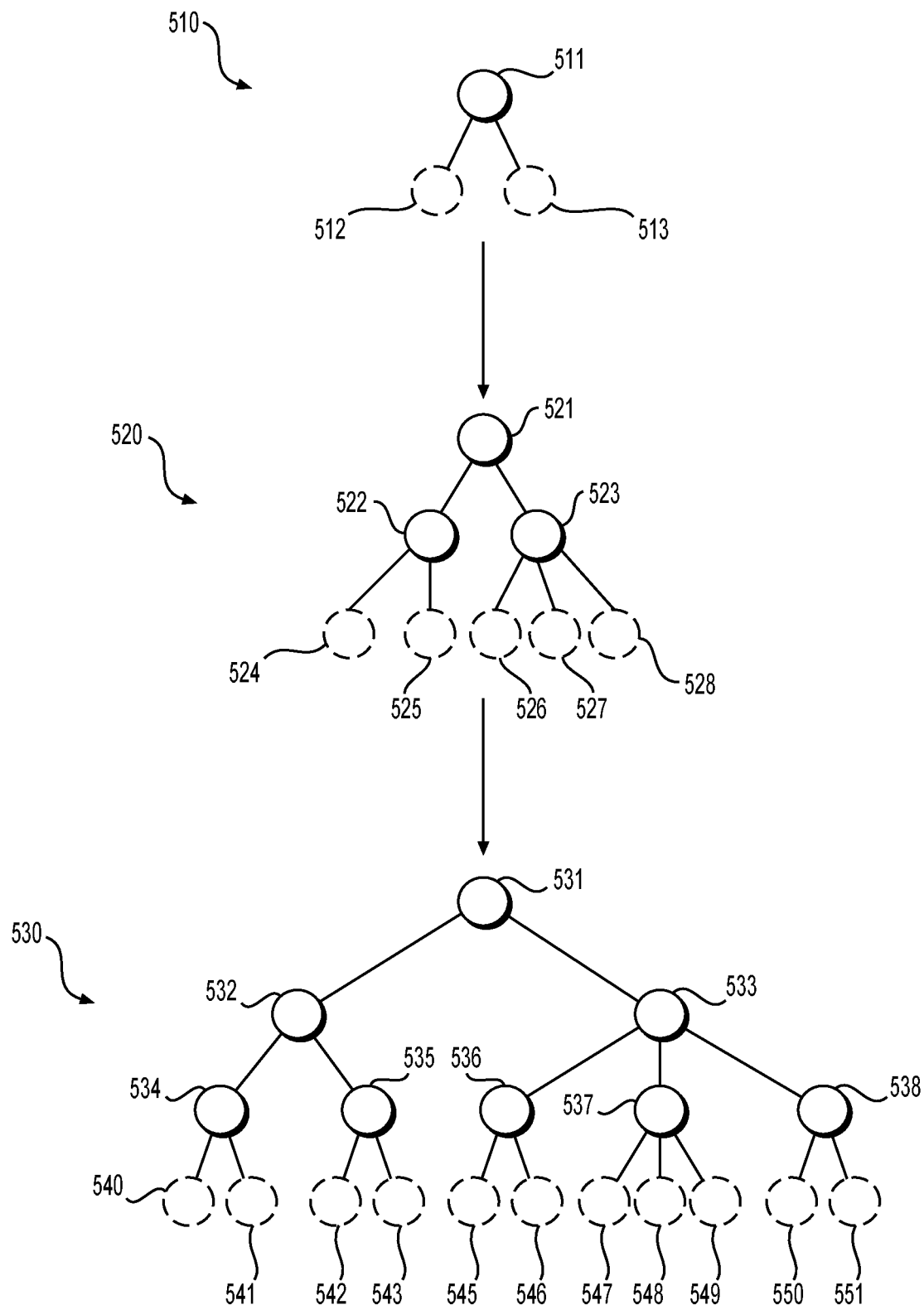
FIG. 5 is a diagram illustrating portions of a preliminary tree model and a complete preliminary tree model in accordance with another embodiment of the present technology.

FIG. 5 illustrates steps in the generation of an embodiment of the trained decision tree prediction model. FIG. 6 and FIG. 7 illustrate sets of proto-trees (also referred to as "preliminary tree models" or "preliminary decision tree prediction models") used for choosing a first factor and a second factor factors to be used in an embodiment of the trained decision tree prediction model.

In FIG. 5, progression of building the trained decision tree prediction model based on a set of factors and training objects is illustrated. It should be noted that the following description of the trained decision tree prediction model as presented in FIG. 5 is only one non-limiting embodiment of the trained decision tree prediction model and it is contemplated that other non-limiting embodiments may have more or fewer nodes, factors, levels and leaves.

Illustrated by a first decision tree 510, the trained decision tree prediction model generation begins by choosing a first factor, associated here with a first node 511. The method by which the factors at each level are chosen will be discussed in more detail below.

There are two leaves 512 and 513 at the end of the paths of the first decision tree 510 branching from the first node 511. Each of the leaves 512 and 513 has "leaf values" which are associated with parameters of interest. In some embodiments, the first factor "f1" has been selected for the first level node 511 of the decision tree 510 on the basis of the set of training objects based on a leaf accuracy parameter and/or an accuracy parameter of the decision tree 510. More details as to how the leaf accuracy parameter and/or the accuracy parameter of the decision tree 510 are determined will be detailed below in connection with a description of methods 800, 900 and 1000.

A second factor "f2" is next chosen and added to the decision tree 510, producing a decision tree 520. A second node 522 and a third node 523 associated with the second factor are added to the two branches extended from the first node 511. In an alternative embodiment, the second node 522 and the third node 523 may be associated with distinct factors. In the embodiments illustrated at FIG. 5, the first node 511 remains the same in the decision tree 520 as in the decision tree 510, because the first factor was chosen and fixed at the first level and associated with the first node 511.

Leaves 524 to 528 are now associated with ends of paths of the decision tree 520. The second node 522 has two leaves, a leaf 524 and a leaf 525, branching from the second node 522. The third node 523 has three leaves, a leaf 526, a leaf 527 and a leaf 528 branching from the third node 523. The numbers of leaves branching from any given node may depend, for example, on factors chosen at any given node and features of the training objects upon which the model tree is generated.

As also illustrated in FIG. 5, a third factor "f3" is then chosen and added to the decision tree 520, producing a decision tree 530. The first node 511, the second node 522 and the third node 523 remain the same as they are in the decision tree 510 and the decision tree 520. The first factor and the second factor (and their associated nodes) also remain the same as they have been previously chosen and fixed. New nodes 534-538 are added to branches descending from the second node 522 and the third node 523. New leaves 540-551, associated with ends of paths of the decision tree 530, branch from the new nodes 534-538. Each one of the new leaves 540-551 has a corresponding leaf value associated with one or more parameters of interest. In this example embodiment, three factors have been chosen during the generation of the trained decision tree prediction model. It is contemplated that different embodiments of trained decision tree prediction models could have more or fewer than three factors. It should be appreciated that the tree model under generation may have more or fewer than three levels constructed in the above described way.

The manner in which the factors are chosen for a trained decision tree prediction model, such as that illustrated in FIG. 4 and FIG. 5, will now be discussed with respect to FIG. 6 and FIG. 7.

In order to choose a "best" factor for the first factor, a set of "proto-trees" having a first node are created. In FIG. 6, three proto-trees 610, 620 and 630 are illustrated as representative samples from the set of proto-trees. In each different one of the proto-trees 610, 620 and 630, a first node is associated with a different factor from the set of available factors. For example, a node 611 from the proto-tree 610 is associated with one of the factors, "fa", while a node 621 of the proto-tree 620 is associated with the factor "fb" and while a node 631 of the proto-tree 630 is associated with the factor "fn". In some embodiments, there is one proto-tree created for each of the factors from which the first level factor is to be chosen. Each proto-tree is a different decision tree, although they may be discarded after selection of the best factor to use at the first level node.

In some implementations of the present technology, factors such as the factor "fa", the factor "fb" and the factor "fn" will be associated with features which are numerical and/or categorical. As such, instead of having two leaves per node as would be the case for a decision tree using only binary, many leaves (and branches to which additional nodes may be added) are possible. For example as illustrated in FIG. 6, the proto-tree 610 comprising the node 611 has branches into three leaves 612-614, while the proto-tree 620 and the proto-tree 630 have two leaves 622, 623 and four leaves 632-635, respectively.

Figure 6:
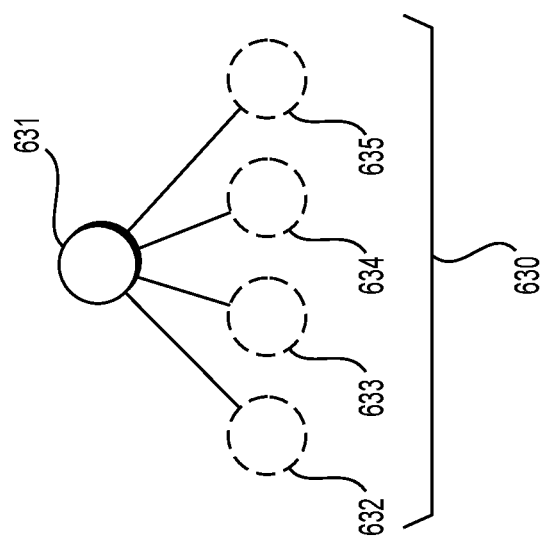
FIG. 6 is a diagram illustrating portions of preliminary tree models in accordance with another embodiment of the present technology.
Figure 6:
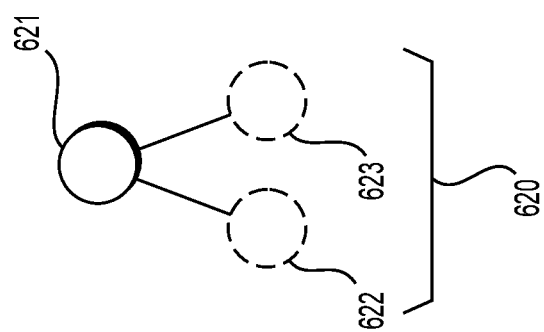
Figure 6:
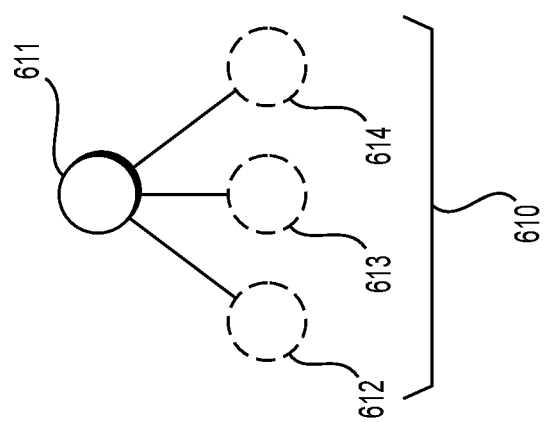
Figure 7:
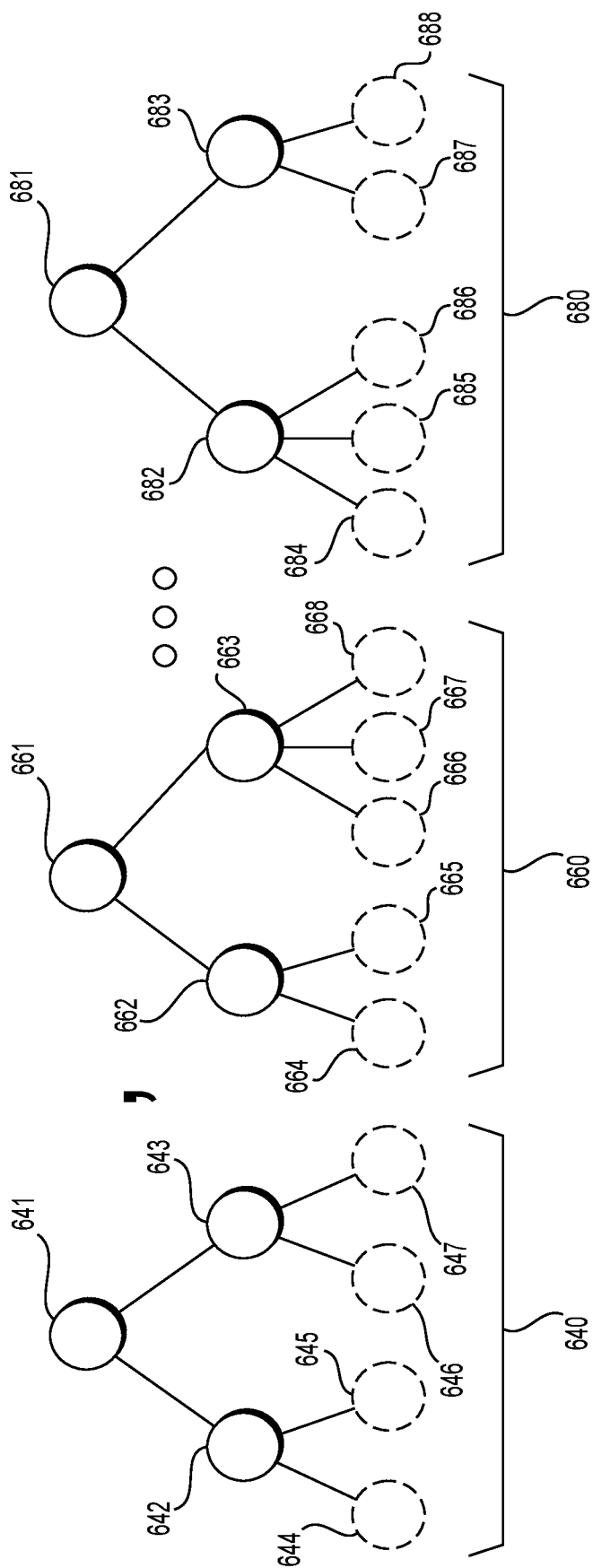
FIG. 7 is a diagram illustrating complete preliminary tree models in accordance with another embodiment of the present technology.

The set of proto-trees of FIG. 6 is then used to select the "best" first factor to add to the trained decision tree prediction model under generation. For each one of the proto-trees, a heuristic function, as introduced above and described in more detail below, is applied to at least some of the leaves branching from the one or more nodes. For example, an accuracy parameter is determined for the proto-trees 610, 620 and 630. In some embodiments, leaf accuracy parameters are calculated for at least some of the leaves, for example for the leaves 612, 613, and 614 of the proto-tree 610. In some embodiments, the leaf accuracy parameters may be combined to determine the accuracy parameter. More details as to how the leaf accuracy parameter and/or the accuracy parameter of a proto-tree are determined will be detailed below in connection with a description of methods 800, 900 and 1000.

The first factor to be used for the tree model being created may then be chosen by selecting a "best quality" proto-tree based on the accuracy parameters for each one of the proto-trees. A factor associated with the "best quality" proto-tree is then chosen as the first factor for the trained decision tree prediction model under generation.

For demonstrative purposes, let us choose the proto-tree 620 as being the "best" proto-tree, for example based on a determination that the proto-tree 620 is associated with a highest accuracy parameter. Turning now to FIG. 7, a second set of proto-trees have been created in order to choose a best second level factor to add to the trained decision tree prediction model under generation. The node 621 and its corresponding branches are kept from the proto-tree 620. The rest of the proto-tree 620 and the first set of proto-trees may now be discarded.

The same set of training objects is then used to test a second set of proto-trees comprising the node 621 associated with the "best" first factor (fixed by the above process) and two nodes associated with a second factor, the second factor being a different one of the set of factors for each one of the proto-trees. In this example, there are two second level nodes because there were two branches associated with the node 621. If the "best" proto-tree had been the proto-tree 630 instead, there would be four nodes associated with the four branches emanating from the node 631. As illustrated in the three representative examples of proto-trees 640, 660 and 680 from the second set of proto-trees shown in FIG. 7, the first node of each proto-tree is the node 621 from the best first proto-tree and there are, added to the two branches emanating from the node 621, two nodes 642, 643 for the proto-tree 640; two nodes 662, 663 for the proto-tree 660 and two nodes 682, 683 for the proto-tree 680. Each one of the ends of the proto-trees 640, 660 and 680 are associated with leaves, leaves 644-647; 664-668 and 684-688, respectively.

A "best" second factor is now chosen in a same way as described above for the "best" first factor, where the proto-tree composed of the first factor and second factor have, according to the heuristic function, a "better quality" (i.e., having a higher accuracy parameter) than other proto-trees that were not selected. Then, the second factor associated with the second nodes of the proto-tree having the highest accuracy parameter is chosen as the second factor to be fixed in the trained decision tree prediction model under generation. For example, if the proto-tree 660 is determined to be the proto-tree with a highest accuracy parameter, the node 662 and the node 663 will be added to the trained decision tree prediction model under generation.

Similarly, if subsequent factors and levels are to be added, a new set of proto-trees will be created using the node 621, the node 662 and the node 663, with new nodes added to the five branches emanating from the node 662 and the node 663. The method would be carried on for as many levels and associated factors are desired in the trained decision tree prediction model under generation. It is contemplated that the trained decision tree prediction model may have more or fewer than three levels constructed in the above described way.

Once the trained decision tree prediction model is completed, the determination of the accuracy parameter may also be carried out for the finished prediction model. In some embodiments, a set of trained decision tree prediction models may be relied upon to define a prediction model instead of a single trained decision tree prediction model, each trained decision tree prediction model of the set may have been generated in accordance with the method set forth above. In some embodiments, the factors may be selected from a same set of factors and a same set of training objects may be used.

Having described, with reference to FIG. 1 to FIG. 7, some non-limiting example instances of systems and computer-implemented methods used in connection with the problem of generating a trained decision tree prediction model and/or establishing an accuracy parameter of a trained decision tree prediction model, we shall now describe general solutions to the problem with reference to FIG. 8 to FIG. 11.

Figure 8:
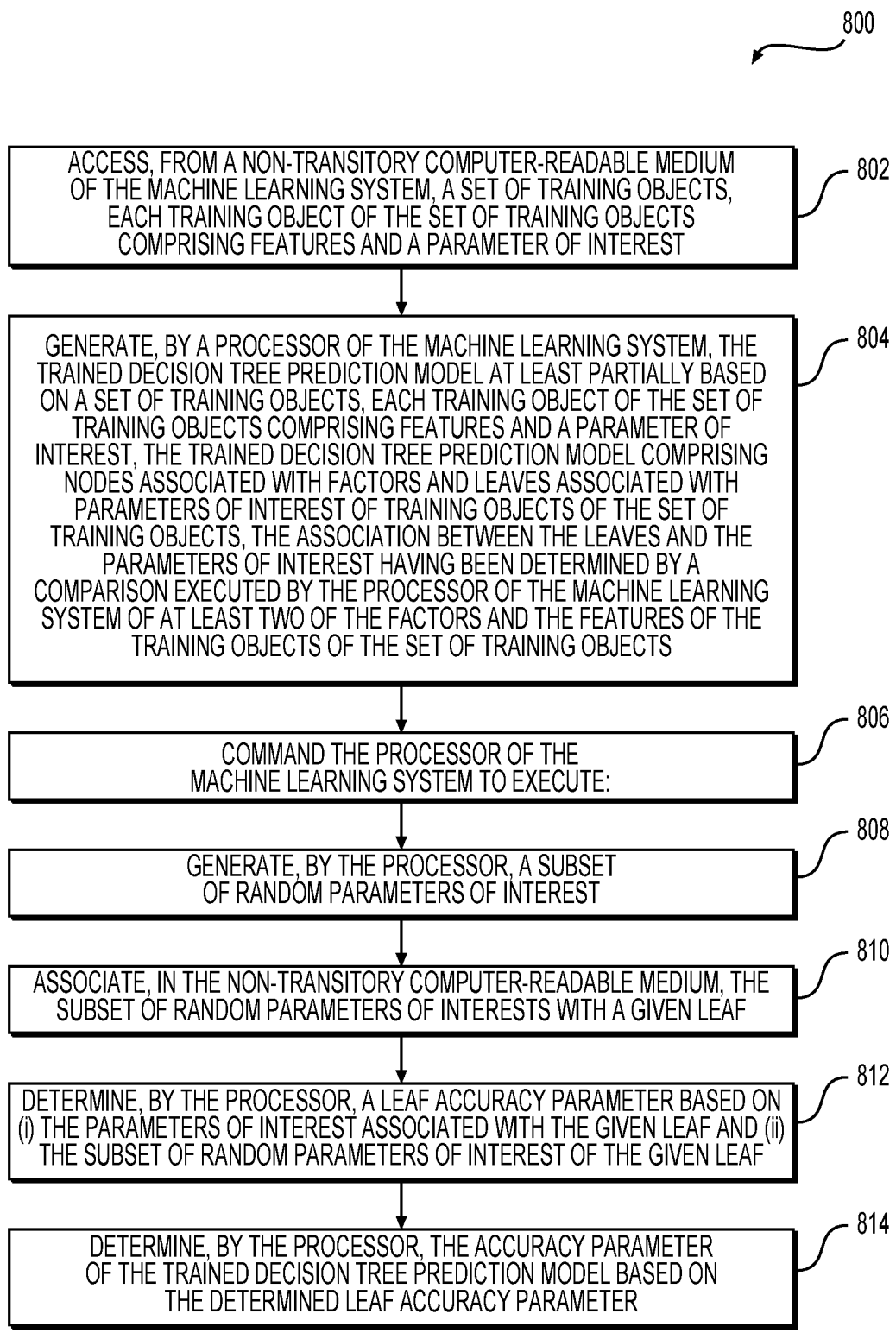
FIG. 8 is a diagram illustrating a flowchart illustrating a first computer-implemented method implementing embodiments of the present technology.

More specifically, FIG. 8 shows a flowchart illustrating a first computer-implemented method 800 of determining an accuracy parameter of a trained decision tree prediction model. In some embodiments, the method 800 may be (completely or partially) implemented on the master server 210 and/or the slave servers 230, 232 and 234.

The method 800 starts at step 802 by accessing, from a non-transitory computer-readable medium of the machine learning system, a set of training objects, each training object of the set of training objects comprising features and a parameter of interest. Then, at a step 804, the method 800 generates, by a processor of the machine learning system, the trained decision tree prediction model at least partially based on a set of training objects, each training object of the set of training objects comprising features and a parameter of interest, the trained decision tree prediction model comprising nodes associated with factors and leaves associated with parameters of interest of training objects of the set of training objects, the association between the leaves and the parameters of interest having been determined by a comparison executed by the processor of the machine learning system of at least two of the factors and the features of the training objects of the set of training objects.

At a step 806, the method 800 commands the processor of the machine learning system to execute steps 808, 810, 812 and 814. At the step 808, the processor executes generating a subset of random parameters of interest. At the step 810, the processor executes associating, in the non-transitory computer-readable medium, the subset of random parameters of interests with a given leaf. At the step 812, the processor executes determining a leaf accuracy parameter based on (i) the parameters of interest associated with the given leaf and (ii) the subset of random parameters of interest of the given leaf. At the step 814, the processor executes determining the accuracy parameter of the trained decision tree prediction model based on the determined leaf accuracy parameter.

Figure 9:
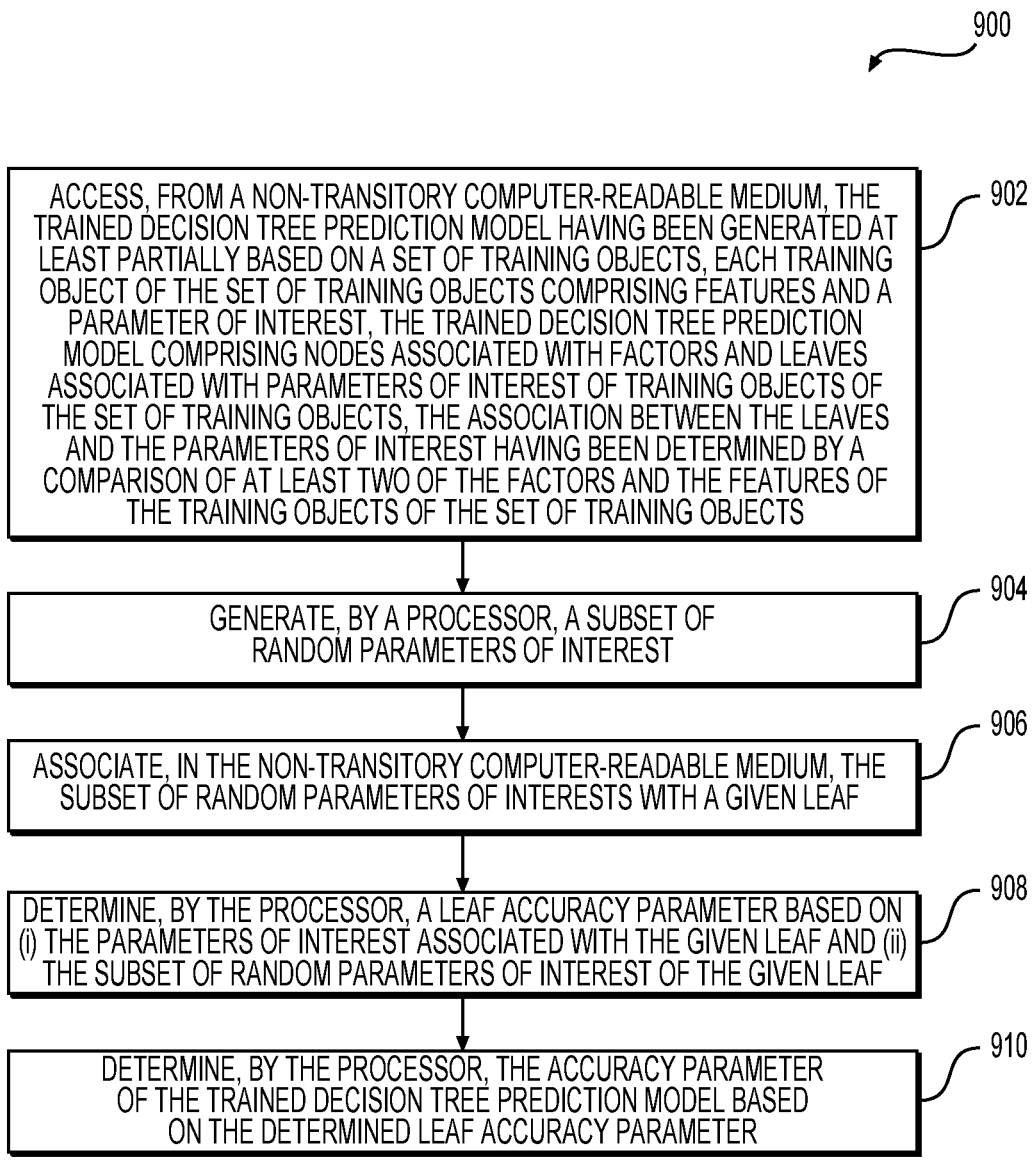
FIG. 9 is a diagram illustrating a flowchart illustrating a second computer-implemented method implementing embodiments of the present technology.

Turning now to FIG. 9, there is shown a flowchart illustrating a second computer-implemented method 900 of determining an accuracy parameter of a trained decision tree prediction model. In some embodiments, the method 900 may be (completely or partially) implemented on the master server 210 and/or the slave servers 230, 232 and 234. As a person skilled in the art of the present technology may appreciate, some or all of the aspects and alternative embodiments recited in connection with the method 900 may equally be applicable to or adaptable to the methods 800, 1000 and 1100.

The method 900 starts at step 902 by accessing, from a non-transitory computer-readable medium, the trained decision tree prediction model having been generated at least partially based on a set of training objects, each training object of the set of training objects comprising features and a parameter of interest, the trained decision tree prediction model comprising nodes associated with factors and leaves associated with parameters of interest of training objects of the set of training objects, the association between the leaves and the parameters of interest having been determined by a comparison of at least two of the factors and the features of the training objects of the set of training objects. In some embodiments, the comparison of the at least two of the factors and the features of the training objects comprises comparing, by the processor, conditions associated with the at least two of the factors and at least two values associated with the features of the corresponding training object. In some embodiments, the features may be indicative of at least one of a number of clicks, a number of views, a document ranking, a URL, a domain name, an IP address, a search query and a key word. In some embodiments, the parameter of interest may be indicative of at least one of a search result prediction, a probability of click, a document relevance, a user interest, a URL, a number of clicks and a click-through rate (CTR). In some embodiments, each one of the factors may be associated with one of (i) a condition applicable to a binary feature, (ii) a condition applicable to a numerical feature and (iii) a condition applicable to a categorical feature.

At a step 904, the method 900 generates, by a processor, a subset of random parameters of interest. In some embodiments, generating, by the processor, the subset of random parameters of interest comprises generating random values of a target function associated with the trained decision tree prediction model. In some embodiments, the random values are selected so as to increase an error associated with a best factor amongst the factors while maintaining a previously generated accuracy parameter of the trained decision tree prediction model below a minimum threshold. The best factor amongst the factors may be determined as the factor having a higher positive impact on the previously generated accuracy parameter of the trained decision tree prediction model. The random values may be selected based on values of the parameters of interest associated with the given leaf. The random values may be selected so as to be comprised within a range comprising a minimum value defined as a lowest value of the parameters of interest associated with the given leaf and a maximum value defined as a highest value of the parameters of interest associated with the given leaf. The subset of random parameters of interest may comprise a number of random parameters of interest equals to a number of parameters of interest of the given leaf with which the subset of random parameters of interest is associated.

At a step 906, the method 900 associates, in the non-transitory computer-readable medium, the subset of random parameters of interests with a given leaf.

At a step 908, the method 900 determines, by the processor, a leaf accuracy parameter based on (i) the parameters of interest associated with the given leaf and (ii) the subset of random parameters of interest of the given leaf.

At a step 910, the method 900 determines, by the processor, the accuracy parameter of the trained decision tree prediction model based on the determined leaf accuracy parameter. In some embodiments, determining, by the processor, the accuracy parameter of the trained decision tree prediction model based on the determined leaf accuracy parameter comprises determining a total error in the leaves in accordance with the formula:

$$\sum_{j=1}^{M}\left[\left(\sum_{i\in b_j} target_i\right)^2 - \sum_{i=1}^{N_j} target_i^2\right] \times \log(N_j + 1)$$

wherein M is a number of leaves and $N_j$ is a number of parameters of interest associated with a j-th leaf.

In some embodiments, the number of parameters of interest associated with the j-th leaf is equal to a number of training objects associated with the j-th leaf. In addition, determining, by the processor, the accuracy parameter of the trained decision tree prediction model may be based on a plurality of determined leaf accuracy parameters, each one of the plurality of determined leaf accuracy parameters being associated with a distinct leaf. In some embodiments, the accuracy parameter of the trained decision tree prediction model may be reflective of an accuracy of a target function associated with the trained decision tree prediction model.

Figure 10:
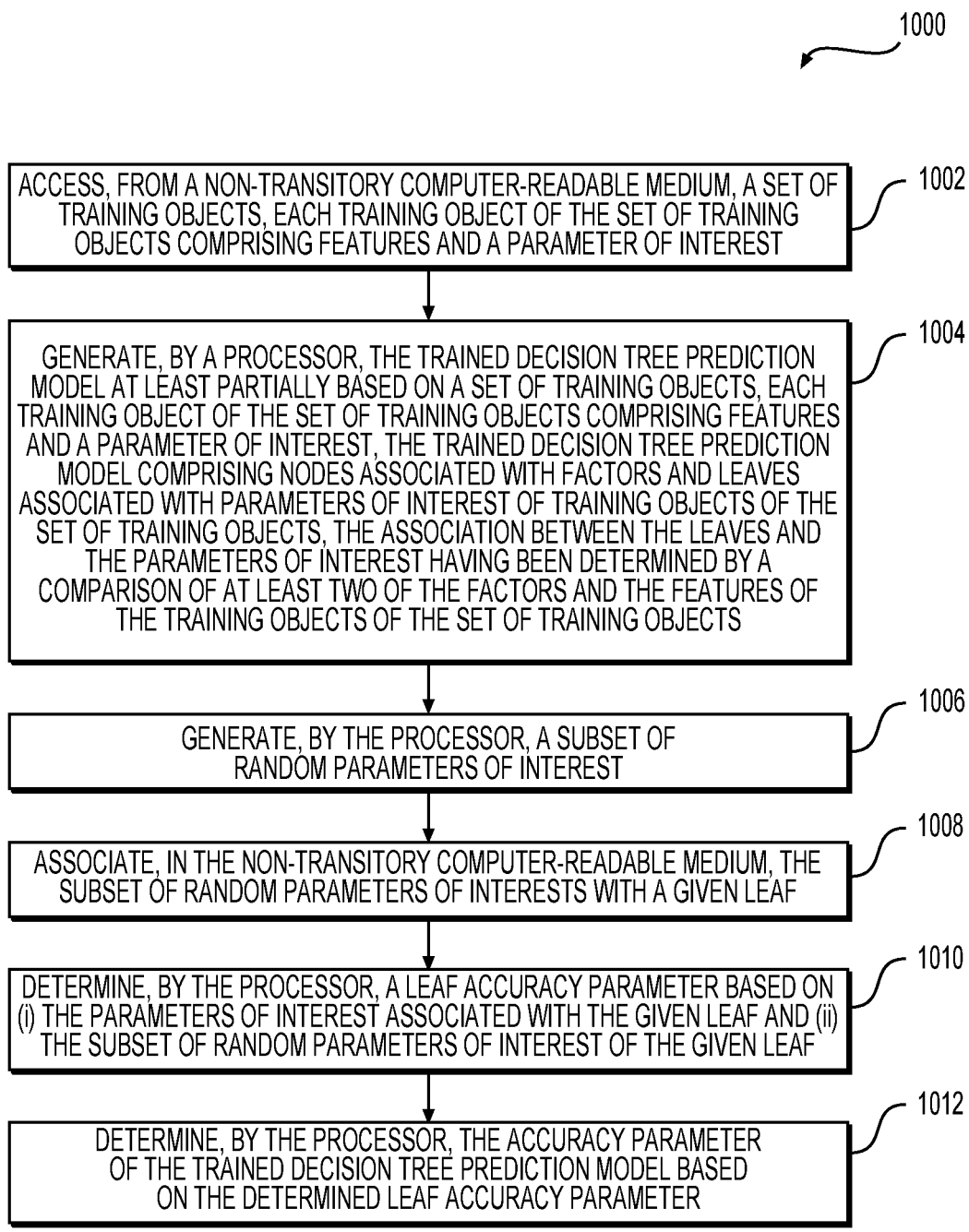
FIG. 10 is a diagram illustrating a flowchart illustrating a third computer-implemented method implementing embodiments of the present technology.

Turning now to FIG. 10, there is shown a flowchart illustrating a third computer-implemented method 1000 of determining an accuracy parameter of a trained decision tree prediction model. In some embodiments, the method 1000 may be (completely or partially) implemented on the master server 210 and/or the slave servers 230, 232 and 234.

The method 1000 starts at a step 1002 by accessing, from a non-transitory computer-readable medium, a set of training objects, each training object of the set of training objects comprising features and a parameter of interest. Then, at a step 1004, the method 1000 generates, by a processor, the trained decision tree prediction model at least partially based on a set of training objects, each training object of the set of training objects comprising features and a parameter of interest, the trained decision tree prediction model comprising nodes associated with factors and leaves associated with parameters of interest of training objects of the set of training objects, the association between the leaves and the parameters of interest having been determined by a comparison of at least two of the factors and the features of the training objects of the set of training objects.

At a step 1006, the method 1000 generates, by the processor, a subset of random parameters of interest. Then, at a step 1008, the method 1000 associates, in the non-transitory computer-readable medium, the subset of random parameters of interests with a given leaf. At a step 1010, the method 1000 determines, by the processor, a leaf accuracy parameter based on (i) the parameters of interest associated with the given leaf and (ii) the subset of random parameters of interest of the given leaf. At a step 1012, the method 1000 determines, by the processor, the accuracy parameter of the trained decision tree prediction model based on the determined leaf accuracy parameter.

Figure 11:
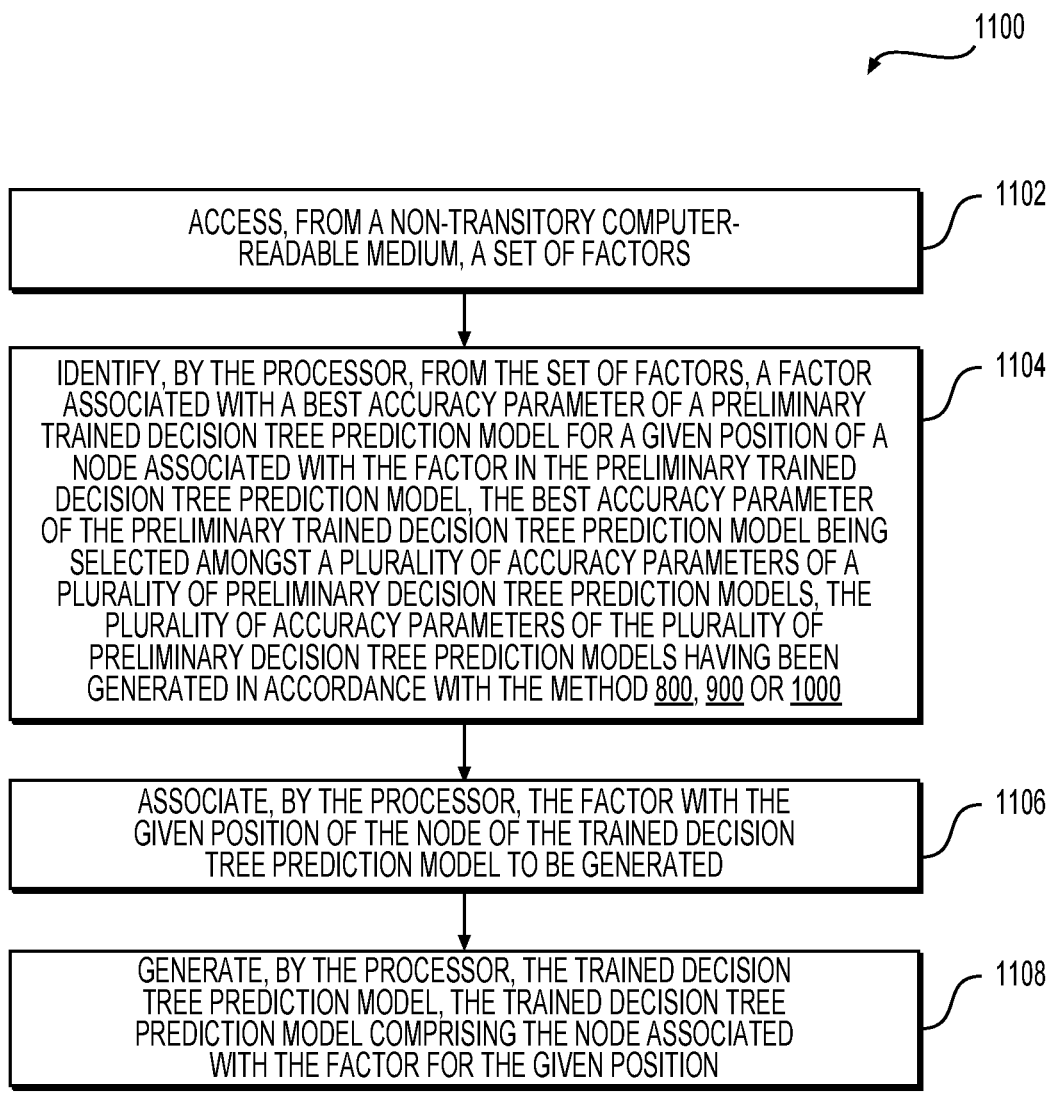
FIG. 11 is a diagram illustrating a flowchart illustrating a fourth computer-implemented method implementing embodiments of the present technology.

Turning now to FIG. 11, there is shown a flowchart illustrating a fourth computer-implemented method 1100 of generating a trained decision tree prediction model. In some embodiments, the method 1100 may be (completely or partially) implemented on the master server 210 and/or the slave servers 230, 232 and 234.

The method 1100 starts at a step 1102 by accessing, from a non-transitory computer-readable medium, a set of factors. Then, at a step 1104, the method 1100 identifies, by the processor, from the set of factors, a factor associated with a best accuracy parameter of a preliminary trained decision tree prediction model for a given position of a node associated with the factor in the preliminary trained decision tree prediction model, the best accuracy parameter of the preliminary trained decision tree prediction model being selected amongst a plurality of accuracy parameters of a plurality of preliminary decision tree prediction models, the plurality of accuracy parameters of the plurality of preliminary decision tree prediction models having been generated in accordance with the methods 800, 900 or 1000. Other variations based on the method 800, 900 or 1000 may also be envisioned by the person skilled in the art of the present technology without departing from the scope of the present technology.

The method 1100, at a step 1106 executes associating, by the processor, the factor with the given position of the node of the trained decision tree prediction model to be generated. At a step 1108, the method 1100 generates, by the processor, the trained decision tree prediction model, the trained decision tree prediction model comprising the node associated with the factor for the given position. In some embodiments, each one of the plurality of accuracy parameters is associated with a corresponding one of the plurality of preliminary decision tree prediction models.

In some embodiments, the method 1100 also comprises a first additional step and a second additional step. The first additional step comprises identifying, by the processor, from the set of factors, another factor associated with a best accuracy parameter of another preliminary trained decision tree prediction model for another given position of another node associated with the other factor in the other preliminary trained decision tree prediction model. The second additional step comprises associating, by the processor, the other factor with the other given position of the other node of the trained decision tree prediction model to be generated.

In some embodiments, the trained decision tree prediction model further comprises the other node associated with the other factor for the other given position.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

As such, the methods and systems implemented in accordance with some non-limiting embodiments of the present technology can be represented as follows, presented in numbered clauses.

[Clause 1] A method (800) of determining an accuracy parameter of a trained decision tree prediction model (400), the method being executable at a machine learning system (210, 230, 232, 234), the method (800) comprising:

accessing (802), from a non-transitory computer-readable medium (120, 130) of the machine learning system, a set of training objects, each training object of the set of training objects comprising features and a parameter of interest;

generating (804), by a processor (110) of the machine learning system, the trained decision tree prediction model (400) at least partially based on a set of training objects, each training object of the set of training objects comprising features and a parameter of interest, the trained decision tree prediction model (400) comprising nodes (402, 404, 406, 408, 410, 412, 414) associated with factors and leaves (420, 422, 424, 426) associated with parameters of interest of training objects of the set of training objects, the association between the leaves (420, 422, 424, 426) and the parameters of interest having been determined by a comparison executed by the processor (110) of the machine learning system of at least two of the factors and the features of the training objects of the set of training objects;

commanding (806) the processor (110) of the machine learning system to execute:

generating (808), by the processor (110), a subset of random parameters of interest;

associating (810), in the non-transitory computer-readable medium (120, 130), the subset of random parameters of interests with a given leaf;

determining (812), by the processor (110), a leaf accuracy parameter based on (i) the parameters of interest associated with the given leaf and (ii) the subset of random parameters of interest of the given leaf; and determining (814), by the processor (110), the accuracy parameter of the trained decision tree prediction model based on the determined leaf accuracy parameter.

[Clause 2] A method (900) of determining an accuracy parameter of a trained decision tree prediction model (400), the method (900) being executable at a machine learning system (210, 230, 232, 234), the method (900) comprising:

accessing (902), from a non-transitory computer-readable medium (120, 130), the trained decision tree prediction model (400) having been generated at least partially based on a set of training objects, each training object of the set of training objects comprising features and a parameter of interest, the trained decision tree prediction model (400) comprising nodes (402, 404, 406, 408, 410, 412, 414) associated with factors and leaves (420, 422, 424, 426) associated with parameters of interest of training objects of the set of training objects, the association between the leaves (420, 422, 424, 426) and the parameters of interest having been determined by a comparison of at least two of the factors and the features of the training objects of the set of training objects;

generating (904), by a processor (110), a subset of random parameters of interest;

associating (906), in the non-transitory computer-readable medium (120, 130), the subset of random parameters of interests with a given leaf;

determining (908), by the processor (110), a leaf accuracy parameter based on (i) the parameters of interest associated with the given leaf and (ii) the subset of random parameters of interest of the given leaf; and determining (910), by the processor (110), the accuracy parameter of the trained decision tree prediction model based on the determined leaf accuracy parameter.

[Clause 3] The method (900) of clause 2, wherein the comparison of the at least two of the factors and the features of the training objects comprises comparing, by the processor (110), conditions associated with the at least two of the factors and at least two values associated with the features of the corresponding training object.

[Clause 4] The method of any one of clauses 2 and 3, wherein generating, by the processor (110), the subset of random parameters of interest comprises generating random values of a target function associated with the trained decision tree prediction model (400).

[Clause 5] The method of clause 4, wherein the random values are selected so as to increase an error associated with a best factor amongst the factors while maintaining a previously generated accuracy parameter of the trained decision tree prediction model (400) below a minimum threshold.

[Clause 6] The method of clause 5, wherein the best factor amongst the factors is determined as the factor having a higher positive impact on the previously generated accuracy parameter of the trained decision tree prediction model (400).

[Clause 7] The method of any one of clauses 4 to 6, wherein the random values are selected based on values of the parameters of interest associated with the given leaf.

[Clause 8] The method of clause 7, wherein the random values are selected so as to be comprised within a range comprising a minimum value defined as a lowest value of the parameters of interest associated with the given leaf and a maximum value defined as a highest value of the parameters of interest associated with the given leaf.

[Clause 9] The method of any one of clauses 2 to 8, wherein the subset of random parameters of interest comprises a number of random parameters of interest equals to a number of parameters of interest of the given leaf with which the subset of random parameters of interest is associated.

[Clause 10] The method of any one of clauses 2 to 9, wherein determining, by the processor (110), the accuracy parameter of the trained decision tree prediction model (400) based on the determined leaf accuracy parameter comprises determining a total error in the leaves in accordance with the formula:

$$\sum_{j=1}^{M}\left[\left(\sum_{i\in b_j} target_i\right)^2 - \sum_{i=1}^{N_j} target_i^2\right] \times \log(N_j + 1)$$

wherein M is a number of leaves and $N_N$ is a number of parameters of interest associated with a j-th leaf.

[Clause 11] The method of clause 10, wherein the number of parameters of interest associated with the j-th leaf is equal to a number of training objects associated with the j-th leaf.

[Clause 12] The method of any one of clauses 2 to 11, wherein determining, by the processor (110), the accuracy parameter of the trained decision tree prediction model is based on a plurality of determined leaf accuracy parameters, each one of the plurality of determined leaf accuracy parameters being associated with a distinct leaf.

[Clause 13] The method of clause 2, wherein the features are indicative of at least one of a number of clicks, a number of views, a document ranking, a URL, a domain name, an IP address, a search query and a key word.

[Clause 14] The method of clause 2, wherein the parameter of interest is indicative of at least one of a search result prediction, a probability of click, a document relevance, a user interest, a URL, a number of clicks and a click-through rate (CTR).

[Clause 15] The method of any one of clauses 2 to 14, wherein the accuracy parameter of the trained decision tree prediction model is reflective of an accuracy of a target function associated with the trained decision tree prediction model (400).

[Clause 16] The method of any one of clauses 2 to 15, wherein each one of the factors is associated with one of (i) a condition applicable to a binary feature, (ii) a condition applicable to a numerical feature and (iii) a condition applicable to a categorical feature.

[Clause 17] A method (1100) of generating a trained decision tree prediction model (400), the method (1100) being executable at a machine learning system (210, 230, 232, 234), the method (1100) comprising:

accessing (1102), from a non-transitory computer-readable medium (120, 130), a set of factors;

identifying (1104), by the processor (110), from the set of factors, a factor associated with a best accuracy parameter of a preliminary trained decision tree prediction model (510, 520, 530, 610, 620, 630, 640, 660, 680) for a given position of a node associated with the factor in the preliminary trained decision tree prediction model (510, 520, 530, 610, 620, 630, 640, 660, 680), the best accuracy parameter of the preliminary trained decision tree prediction model (510, 520, 530, 610, 620, 630, 640, 660, 680) being selected amongst a plurality of accuracy parameters of a plurality of preliminary decision tree prediction models, the plurality of accuracy parameters of the plurality of preliminary decision tree prediction models having been generated in accordance with the method of any one of clauses 2 to 16 and 21;

associating (1106), by the processor (110), the factor with the given position of the node of the trained decision tree prediction model (400) to be generated; and generating (1108), by the processor (110), the trained decision tree prediction model (400), the trained decision tree prediction model (400) comprising the node associated with the factor for the given position.

[Clause 18] The method of clause 17, wherein each one of the plurality of accuracy parameters is associated with a corresponding one of the plurality of preliminary decision tree prediction models.

[Clause 19] The method of any one of clauses 17 and 18, wherein the method (1100) further comprises:

identifying, by the processor (110), from the set of factors, another factor associated with a best accuracy parameter of another preliminary trained decision tree prediction model (510, 520, 530, 610, 620, 630, 640, 660, 680) for another given position of another node associated with the other factor in the other preliminary trained decision tree prediction model (510, 520, 530, 610, 620, 630, 640, 660, 680); and associating, by the processor (110), the other factor with the other given position of the other node of the trained decision tree prediction model (400) to be generated.

[Clause 20] The method of any one of clauses 17 to 19, wherein the trained decision tree prediction model (400) further comprises the other node associated with the other factor for the other given position.

[Clause 21] A method (1000) of determining an accuracy parameter of a trained decision tree prediction model (400), the method being executable at a machine learning system (210, 230, 232, 234), the method (1000) comprising:

accessing (1002), from a non-transitory computer-readable medium (120, 130), a set of training objects, each training object of the set of training objects comprising features and a parameter of interest;

generating (1004), by a processor (110), the trained decision tree prediction model (400) at least partially based on a set of training objects, each training object of the set of training objects comprising features and a parameter of interest, the trained decision tree prediction model comprising nodes (402, 404, 406, 408, 410, 412, 414) associated with factors and leaves (420, 422, 424, 426) associated with parameters of interest of training objects of the set of training objects, the association between the leaves (420, 422, 424, 426) and the parameters of interest having been determined by a comparison of at least two of the factors and the features of the training objects of the set of training objects;

generating (1006), by the processor (110), a subset of random parameters of interest;

associating (1008), in the non-transitory computer-readable medium (120, 130), the subset of random parameters of interests with a given leaf;

determining (1010), by the processor (110), a leaf accuracy parameter based on (i) the parameters of interest associated with the given leaf and (ii) the subset of random parameters of interest of the given leaf; and determining (1012), by the processor (110), the accuracy parameter of the trained decision tree prediction model (400) based on the determined leaf accuracy parameter.

[Clause 22] A computer-implemented system (210, 230, 232, 234) configured to perform the method of any one of clauses 1 to 21.

[Clause 23] A non-transitory computer-readable medium (120, 130), comprising computer-executable instructions that cause a system (210, 230, 232, 234), to execute the method according to any one of clauses 1 to 21.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of determining an accuracy parameter of a trained decision tree prediction model, the method being executable at a machine learning system, the method comprising:

accessing, from a non-transitory computer-readable medium, the trained decision tree prediction model having been generated at least partially based on a set of training objects, a given training object of the set of training objects comprising features and a respective label, the trained decision tree prediction model comprising nodes associated with factors and leaves, a given leaf being associated with respective labels of training objects of the set of training objects having been associated with the given leaf, the association between the leaves and labels having been determined by a comparison of at least two of the factors and the features of the training objects of the set of training objects;

generating, by a processor, a subset of random values for the given leaf, such that:

the subset of random values associated with the given leaf has a range of values; and each of the subset of random values has been randomly picked from a range between a minimum value of the range of values and a maximum value of the range of values;

associating, in the non-transitory computer-readable medium, the subset of random values with the given leaf, such that the given leaf has a combination of (i) the respective labels associated with training objects having been associated to the given leaf and (ii) the subset of random values having been associated with given leaf;

determining, by the processor, a leaf accuracy parameter for the given leaf based on (i) the respective labels associated with the given leaf and (ii) the subset of random values of the given leaf; and determining, by the processor, the accuracy parameter of the trained decision tree prediction model based on the determined leaf accuracy parameter for each of the leaves of the trained decision tree prediction model.

2. The method of claim 1, wherein the comparison of the at least two of the factors and the features of the training objects comprises comparing, by the processor, conditions associated with the at least two of the factors and at least two values associated with the features of the corresponding training object.

3. The method of claim 1, wherein the generating, by the processor, the subset of random values comprises generating random values of a target function associated with the trained decision tree prediction model.

4. The method of claim 3, wherein the random values are selected so as to increase an error associated with a best factor amongst the factors while maintaining a previously generated accuracy parameter of the trained decision tree prediction model below a minimum threshold, the best factor amongst the factors being determined as the factor maximizing the previously generated accuracy parameter of the trained decision tree prediction model.

5. The method of claim 1, wherein the subset of random values comprises a number of random values equal to a number of the respective labels of the given leaf with which the subset of random values is associated.

6. The method of claim 1, wherein the determining, by the processor, the accuracy parameter of the trained decision tree prediction model based on the determined leaf accuracy parameter comprises determining a total error in the leaves in accordance with the formula:

$$\sum_{j=1}^{M}\left[\left(\sum_{i\in b_j} target_i\right)^2 - \sum_{i=1}^{N_j} target_i^2\right] \times \log(N_j+1)$$

wherein M is a number of leaves and $N_j$ is a number of the respective labels associated with a j-th leaf, and $b_j$ is a number of values in the subset of random values associated with the j-th leaf.

7. The method of claim 6, wherein the number of the respective labels associated with the j-th leaf is equal to a number of training objects associated with the j-th leaf.

8. The method of claim 1, wherein the determining, by the processor, the accuracy parameter of the trained decision tree prediction model is based on a plurality of determined leaf accuracy parameters, each one of the plurality of determined leaf accuracy parameters being associated with a distinct leaf.

9. The method of claim 1, wherein the features are indicative of at least one of a number of clicks, a number of views, a document ranking, a URL, a domain name, an IP address, a search query and a key word.

10. The method of claim 1, wherein a given label associated with the given leaf is indicative of at least one of a search result prediction, a probability of click, a document relevance, a user interest, a URL, a number of clicks and a click-through rate (CTR).

11. The method of claim 1, wherein the accuracy parameter of the trained decision tree prediction model is reflective of an accuracy of a target function associated with the trained decision tree prediction model.

12. The method of claim 1, wherein each one of the factors is associated with one of (i) a condition applicable to a binary feature, (ii) a condition applicable to a numerical feature and (iii) a condition applicable to a categorical feature.

13. The method of claim 1, wherein the trained decision tree prediction model has been generated by executing:

accessing, from a non-transitory computer-readable medium, a set of factors;

identifying, by the processor, from the set of factors, a factor associated with a best accuracy parameter of a preliminary trained decision tree prediction model for a given position of a node associated with the factor in the preliminary trained decision tree prediction model, the best accuracy parameter of the preliminary trained decision tree prediction model being selected amongst a plurality of accuracy parameters of a plurality of preliminary decision tree prediction models as a highest accuracy parameter thereamong, wherein a given one of the plurality of accuracy parameters of a respective given one of the plurality of preliminary decision tree prediction models was determined based on a leaf accuracy parameter;

associating, by the processor, the factor with the given position of the node of the trained decision tree prediction model to be generated; and generating, by the processor, the trained decision tree prediction model, the trained decision tree prediction model comprising the node associated with the factor for the given position.

14. The method of claim 13, wherein each one of the plurality of accuracy parameters is associated with a corresponding one of the plurality of preliminary decision tree prediction models.

15. The method of claim 13, wherein the method further comprises:

identifying, by the processor, from the set of factors, an other factor associated with a best accuracy parameter of another preliminary trained decision tree prediction model for another given position of another node associated with the other factor in the other preliminary trained decision tree prediction model; and associating, by the processor, the other factor with the other given position of the other node of the trained decision tree prediction model to be generated.

16. The method of claim 13, wherein the trained decision tree prediction model further comprises the other node associated with the other factor for the other given position.

17. A method of determining an accuracy parameter of a trained decision tree prediction model, the method being executable at a machine learning system, the method comprising:

accessing, from a non-transitory computer-readable medium, a set of training objects, each training object of the set of training objects comprising features and a respective label;

generating, by a processor, the trained decision tree prediction model at least partially based on a set of training objects, each training object of the set of training objects comprising features and a parameter of interest, the trained decision tree prediction model comprising nodes associated with factors and leaves, a given leaf being associated with respective labels of training objects of the set of training objects having been associated with the given leaf, the association between the leaves and labels having been determined by a comparison of at least two of the factors and the features of the training objects of the set of training objects;

generating, by the processor, a subset of random values for the given leaf, such that:
  the subset of random values associated with the given leaf has a range of values; and
  each of the subset of random values has been randomly picked from a range between a minimum value of the range of values and a maximum value of the range of values;

associating, in the non-transitory computer-readable medium, the subset of random values with the given leaf, such that the given leaf has a combination of the respective labels associated with the training objects having been associated to the given leaf and the subset of random values having been associated with the given leaf;

determining, by the processor, a leaf accuracy parameter based on (i) the respective labels associated with the given leaf and (ii) the subset of random values of the given leaf; and determining, by the processor, the accuracy parameter of the trained decision tree prediction model based on the determined leaf accuracy parameter for each of the leaves of the trained decision tree prediction model.

18. A computer-implemented system for determining an accuracy parameter of a trained decision tree prediction model, the system comprising:
  a non-transitory computer-readable medium;
  a processor configured to perform:
  accessing, from a non-transitory computer-readable medium, the trained decision tree prediction model having been generated at least partially based on a set of training objects, a given training object of the set of training objects comprising features and a respective label, the trained decision tree prediction model comprising nodes associated with factors and leaves, a given leaf being associated with respective labels of training objects of the set of training objects having been associated with the given leaf, the association between the leaves and labels having been determined by a comparison of at least two of the factors and the features of the training objects of the set of training objects;

generating, by a processor, a subset of random values for the given leaf, such that:
    the subset of random values associated with the given leaf has a range of values; and
    each of the subset of random values has been randomly picked from a range between a minimum value of the range of values and a maximum value of the range of values;

associating, in the non-transitory computer-readable medium, the subset of random values with the given leaf, such that the given leaf has a combination of (i) the respective labels associated with training objects having been associated to the given leaf and (ii) the subset of random values having been associated with given leaf;

determining, by the processor, a leaf accuracy parameter for the given leaf based on (i) the respective labels associated with the given leaf and (ii) the subset of random values of the given leaf; and determining, by the processor, the accuracy parameter of the trained decision tree prediction model based on the determined leaf accuracy parameter for each of the leaves of the trained decision tree prediction model.

19. The system of claim 18, wherein the subset of random values comprises a number of random values equal to a number of the respective labels of the given leaf with which the subset of random values is associated.

20. The system of claim 18, wherein the determining, by the processor, the accuracy parameter of the trained decision tree prediction model based on the determined leaf accuracy parameter comprises determining a total error in the leaves in accordance with the formula:

$$\sum_{j=1}^{M}\left[\left(\sum_{i\in b_j} target_i\right)^2 - \sum_{i=1}^{N_j} target_i^2\right] \times \log(N_j + 1)$$

wherein M is a number of leaves and $N_j$ is a number of respective labels associated with a j-th leaf, and $b_j$ is a number of random values in the subset of random values associated with the j-th leaf.

21. A method of determining an accuracy parameter of a trained decision tree prediction model, the method being executable at a machine learning system, the method comprising:
  accessing, from a non-transitory computer-readable medium, the trained decision tree prediction model having been generated at least partially based on a set of training objects, each training object of the set of training objects comprising features and a parameter of interest, the trained decision tree prediction model comprising nodes associated with factors and leaves associated with parameters of interest of training objects of the set of training objects, the association between the leaves and the parameters of interest having been determined by a comparison of at least two of the factors and the features of the training objects of the set of training objects;

generating, by a processor, a subset of random parameters of interest;

associating, in the non-transitory computer-readable medium, the subset of random parameters of interests with a given leaf, such that the given leaf has a combination of the parameters of interest associated with training objects having been associated to the given leaf and the subset of random parameters of interests having been associated with the given leaf:
    the parameters of interest associated with the given leaf having a range of values;
    each of the subset of random parameters of interests having been randomly picked from a range between a minimum value of the range of values and a maximum value of the range of values;

determining, by the processor, a leaf accuracy parameter for the given leaf based on (i) the parameters of interest associated with the given leaf and (ii) the subset of random parameters of interest of the given leaf; and determining, by the processor, the accuracy parameter of the trained decision tree prediction model based on the determined leaf accuracy parameter for each of the trained decision tree prediction model by determining a total error in the leaves in accordance with the formula:

$$\sum_{j=1}^{M} \left[ \left( \sum_{i \in b_j} target_i \right)^2 - \sum_{i=1}^{N_j} target_i^2 \right] \times \log(N_j + 1),$$

wherein M is a number of leaves and $N_j$ is a number of parameters of interest associated with a j-th leaf, and $b_j$ is a number of random parameters of interest associated with the j-th leaf.

* * * * *